US010269181B2

(12) United States Patent
Lodato et al.

(10) Patent No.: US 10,269,181 B2
(45) Date of Patent: Apr. 23, 2019

(54) METHODS AND SYSTEMS FOR GENERATING A VIRTUALIZED PROJECTION OF A CUSTOMIZED VIEW OF A REAL-WORLD SCENE FOR INCLUSION WITHIN VIRTUAL REALITY MEDIA CONTENT

(71) Applicant: Verizon Patent and Licensing Inc., Arlington, VA (US)

(72) Inventors: Michael Lodato, Clinton, NJ (US); Pai Moodlagiri, Clinton, NJ (US); Rene Sepulveda, Fairfax Station, VA (US); Oliver S. Castaneda, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 150 days.

(21) Appl. No.: 15/610,595

(22) Filed: May 31, 2017

(65) Prior Publication Data
US 2018/0350147 A1    Dec. 6, 2018

(51) Int. Cl.
*G06T 15/20* (2011.01)
*G06T 19/00* (2011.01)
*H04N 13/111* (2018.01)
*H04N 13/282* (2018.01)

(52) U.S. Cl.
CPC ............ *G06T 19/006* (2013.01); *G06T 15/20* (2013.01); *G06T 15/205* (2013.01); *H04N 13/111* (2018.05); *H04N 13/282* (2018.05)

(58) Field of Classification Search
None
See application file for complete search history.

(56) References Cited

U.S. PATENT DOCUMENTS

| 6,084,979 | A | 7/2000 | Kanade et al. |
| 6,707,487 | B1 * | 3/2004 | Aman ................. A63B 24/0003 348/169 |
| 2009/0315978 | A1 * | 12/2009 | Wurmlin ................. G06T 5/005 348/43 |
| 2012/0050256 | A1 * | 3/2012 | Thiel ..................... G06T 19/003 345/419 |
| 2014/0192164 | A1 | 7/2014 | Tenn et al. |

(Continued)

FOREIGN PATENT DOCUMENTS

WO    2008/014826    2/2008

*Primary Examiner* — Peter Hoang

(57) ABSTRACT

An exemplary virtualized projection generation system ("system") receives a plurality of captured surface data frame sequences each including color and depth frames depicting a real-world scene in accordance with a respective set of capture parameters included in a plurality of sets of capture parameters associated with different views of the real-world scene. The system identifies an additional set of capture parameters associated with a customized view of the real-world scene distinct from the different captured views. Based on the captured surface data frame sequences and the additional set of capture parameters, the system renders color and depth frames for a virtualized projection of the customized view of the real-world scene. The system then provides a virtualized surface data frame sequence including the rendered color and depth frames for the virtualized projection of the customized view of the real-world scene for inclusion within virtual reality media content.

20 Claims, 16 Drawing Sheets

(56) References Cited

U.S. PATENT DOCUMENTS

| | | | |
|---|---|---|---|
| 2015/0294492 A1* | 10/2015 | Koch | H04N 13/243 345/426 |
| 2016/0042475 A1* | 2/2016 | Tapia | G06Q 50/01 386/224 |
| 2017/0339392 A1* | 11/2017 | Forutanpour | H04N 13/161 |

* cited by examiner

| Metadata 1002 | Tile 1 | Tile Coordinates 1 |
| | | Capture Parameter Set 1 |
| | Tile 2 | Tile Coordinates 2 |
| | | Capture Parameter Set 2 |
| | Tile 3 | Tile Coordinates 3 |
| | | Capture Parameter Set 3 |
| | ... | ... |
| | Tile M | Tile Coordinates M |
| | | Capture Parameter Set M |
| Audio Data 1004 | | Audio Source 1 |
| | | Audio Source 2 |
| | | Audio Source 3 |
| | | ... |
| | | Audio Source M |
| Video Data 1006 | | Video Data Stream |

METHODS AND SYSTEMS FOR GENERATING A VIRTUALIZED PROJECTION OF A CUSTOMIZED VIEW OF A REAL-WORLD SCENE FOR INCLUSION WITHIN VIRTUAL REALITY MEDIA CONTENT

BACKGROUND INFORMATION

Virtual reality media content may be presented to users (i.e., viewers) of the virtual reality media content to immerse the users into interactive virtual reality worlds that the users may experience by directing their attention to any of a variety of things being presented at the same time. For example, at any time during the presentation of virtual reality media content, a user experiencing the virtual reality media content may look around the immersive virtual reality world in any direction, giving the user a sense that he or she is actually present in and experiencing the immersive virtual reality world from a particular location and perspective (e.g., orientation, viewpoint, etc.) within the immersive virtual reality world.

In some examples, it may be desirable for an immersive virtual reality world to be based on a real-world scene. For instance, some or all of an immersive virtual reality world represented within virtual reality media content may model scenery, locations, events, objects, and/or other subjects that exist in the real world, as opposed to existing only in a virtual or an imaginary world. As such, capture devices (e.g., image and/or video capture devices such as cameras, video cameras, etc.) may be used to detect, record, and/or otherwise capture data representative of the real-world scene such that the data may be included within virtual reality media content from which a representation of the real-world scene may be generated. Unfortunately, it may be impossible or impractical to position physical capture devices with respect to the real-world scene so as to capture data from every location, orientation, field of view, etc., that may be desirable.

Moreover, even if a large number of physical capture devices were to be employed to capture data from a large number of locations, orientations, fields of view, and the like, it may be impractical and/or inefficient for all the data captured by these capture devices to be included within the virtual reality media content provided to the user. For example, data distribution limitations (e.g., network bandwidths, device decoding capabilities, etc.), significant redundancy in the captured data, data descriptive of different details of the real-world scene having different relevance to different users of the virtual reality media content at the same time, and other factors may each contribute to the impracticality and/or inefficiency of capturing and distributing the data representative of the real-world scene using large numbers of physical capture devices.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 10 illustrates a data structure representation of the exemplary transport stream of FIG. 9 according to principles described herein.

DETAILED DESCRIPTION OF PREFERRED EMBODIMENTS

Figure 1:
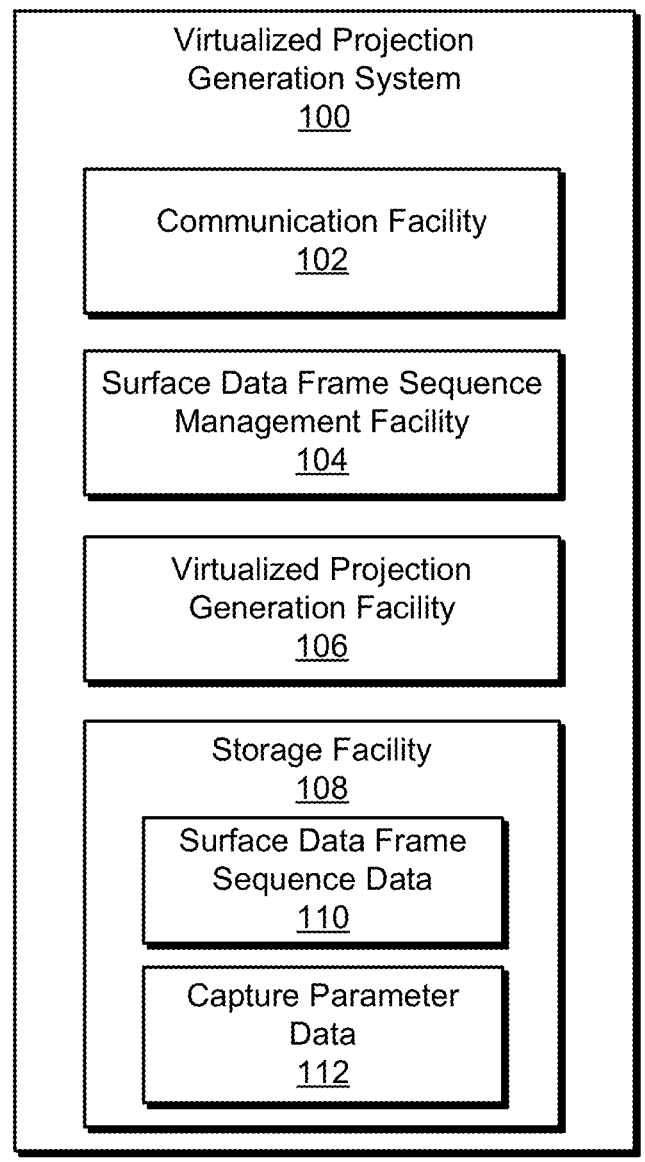
FIG. 1 illustrates an exemplary virtualized projection generation system for generating a virtualized projection of a customized view of a real-world scene for inclusion within virtual reality media content according to principles described herein.

Methods and systems for generating a virtualized projection of a customized view of a real-world scene for inclusion within virtual reality media content are described herein. For example, as will be described in more detail below, a virtualized projection generation system may receive (e.g., request, acquire, access, etc.) a plurality of captured surface data frame sequences. Each surface data frame sequence in the plurality of captured surface data frame sequences may include color and depth frames depicting a real-world scene in accordance with a respective set of capture parameters included in a plurality of sets of capture parameters associated with different views of the real-world scene. For example, each set of capture parameters associated with each view of the real-world scene may include parameters representative of a capture location, orientation, field of view, depth mapping, depth range, quality level, format, source, dynamic range, and/or other characteristics by which the respective surface data frame sequence represents the view of the real-world scene. Each surface data frame sequence in the plurality of captured surface data frame sequences may be captured by a different capture device in a plurality of capture devices disposed at different locations with respect to the real-world scene so as to capture the different views of the real-world scene. For instance, each different capture device may be associated with (e.g., configured to capture the real-world scene in accordance with) one of the different sets of capture parameters in the plurality of sets of capture parameters.

In addition to receiving the plurality of surface data frame sequences associated with the different sets of capture parameters, the virtualized projection generation system may identify an additional set of capture parameters distinct from the sets of capture parameters included in the plurality of sets of capture parameters. The additional set of capture parameters may be associated with a customized view of the real-world scene distinct from the different views of the real-world scene captured by the plurality of capture devices. Based on the surface data frame sequences in the plurality of captured surface data frame sequences and based on the additional set of capture parameters, the virtualized projection generation system may render color and depth frames for a virtualized projection of the customized view of the real-world scene.

The virtualized projection generation system may provide a virtualized surface data frame sequence that includes the rendered color and depth frames for the virtualized projection of the customized view of the real-world scene to one or more other systems (e.g., to one or more media player devices associated with users, to one or more downstream systems in a virtual reality media content provider pipeline, etc.). For example, the virtualized projection generation system may provide the virtualized surface data frame sequence for inclusion within virtual reality media content for a media player device (e.g., virtual reality media content configured to be streamed by way of a virtual reality media provider pipeline to a media player device associated with a user experiencing the virtual reality media content).

Systems and methods for generating a virtualized projection of a customized view of a real-world scene for inclusion within virtual reality media content described herein may provide various advantages and benefits. As one example, systems and methods described herein may allow data representative of virtualized projections (e.g., virtualized surface data frame sequences, etc.) to be generated for customized views of a real-world scene based on arbitrary capture parameters (e.g., arbitrary capture locations, orientations, fields of view, depth mappings, quality levels, sources, dynamic ranges, etc.). As such, virtualized surface data frame sequences may be generated and provided alongside captured surface data frame sequences to cover a robust set of views of the real-world scene that may serve a particular implementation. For example, rather than attempting to position a large number of physical capture devices at various locations with respect to a real-world scene (e.g., to provide various levels of detail of different objects with various different bit depths, etc.), methods and systems described herein may allow for a relatively small number of physical capture devices to capture data from which a large number of virtualized surface data frame sequences may be generated to represent customized views of the real-world scene.

Additionally, by generating capture data (e.g., surface data frame sequences) associated with various different sets of capture parameters (e.g., parameters representing various different vantage points, various different capture resolutions, etc.), systems and methods described herein may facilitate practical and efficient distribution of data captured by the physical capture devices and included within the virtual reality media content provided to end users. For example, high-resolution data captured by eight capture devices disposed around a real-world scene may be used not only to generate eight high-resolution captured surface data frame sequences depicting the real-world scene from the respective views of the eight capture devices, but also to generate a relatively large number (e.g., three hundred) of lower-resolution virtualized surface data frame sequences associated with various customized views different from (e.g., unaligned with) the views of the capture devices.

A virtual reality media content provider system receiving virtualized surface data frame sequences may benefit from increased flexibility in what data the system provides to (i.e., includes within virtual reality media content provided to) particular media player devices at particular times. As such, the virtual reality media content provider may benefit from an increased ability to optimize the data provided to the media player devices such as by not sending large amounts of data to a media player device that are relatively irrelevant to the media player device (e.g., based on various aspects of the specific virtual reality experience the media player device is providing to a user), and by providing data using optimized bit depths in depth representations of surfaces to optimize depth precision and/or depth resolution, as will be described in more detail below.

As an example, rather than distributing all of the high-resolution data captured by the eight physical capture devices to every media player device (which may be impractical or impossible due to the large quantity of the data), customized data may be distributed more selectively and flexibly. Specifically, for example, data customized for a first media player device (e.g., data representative of a few virtualized surface data frame sequences selected from a robust set of virtualized surface data frame sequences) may be distributed to the first media player device to provide a high level of detail of one part of the real-world scene relevant to the user of the first media player device, while data customized for a second media player device (e.g., data representative of a few different virtualized surface data frame sequences) may be distributed to the second media player device to provide a high level of detail of another part of the real-world scene relevant to a user of the second media player device. As such, a virtual reality media content provider system may provide both the first and second media player devices with the data that is relevant to their respective users (e.g., localized data customized for the respective parts of the real-world scene that the users are experiencing) while not overloading either media player device (or any distribution channels used to communicate with the media player devices) with excessive amounts of redundant data or detailed data about parts of the real-world scene that are less relevant to the respective users. In this way, data distribution may be improved and made more efficient and effective by requiring less data to be distributed to client-side media player devices even as user experiences are improved through higher resolution, and more realistic and immersive content. This improvement arises due to the customization of virtual reality media content to dynamically include high-quality representations of only the most relevant parts of the real-world scene.

Various embodiments will now be described in more detail with reference to the figures. The disclosed methods and systems may provide one or more of the benefits mentioned above and/or various additional and/or alternative benefits that will be made apparent herein.

FIG. 1 illustrates an exemplary virtualized projection generation system 100 ("system 100") for generating a virtualized projection of a customized view of a real-world scene for inclusion within virtual reality media content. As shown, system 100 may include, without limitation, a communication facility 102, a surface data frame sequence management facility 104, a virtualized projection generation facility 106, and a storage facility 108 selectively and communicatively coupled to one another. It will be recognized that although facilities 102 through 108 are shown to be separate facilities in FIG. 1, facilities 102 through 108 may be combined into fewer facilities, such as into a single facility, or divided into more facilities as may serve a particular implementation. In some examples, each of facilities 102 through 108 may be distributed between multiple devices and/or multiple locations as may serve a particular implementation. Additionally, it will be understood that, in certain implementations of system 100, certain facilities shown in FIG. 1 (and the associated functionality associated with such facilities) may be omitted from system 100. Each of facilities 102 through 108 will now be described in more detail with reference to certain other figures included herein.

Communication facility 102 may include one or more physical computing devices (e.g., hardware and/or software components such as processors, memories, communication interfaces, instructions stored in memory for execution by the processors, etc.) that perform various operations associated with transmitting and receiving data used and/or provided by system 100. For example, communication facility 102 may receive (or facilitate receiving) a plurality of captured surface data frame sequences each including color and depth frames depicting a real-world scene in accordance with a respective set of capture parameters included in a plurality of sets of capture parameters associated with different views of the real-world scene.

Communication facility 102 may receive the plurality of captured surface data frame sequences in any way as may serve a particular implementation. For instance, in certain embodiments, each surface data frame sequence in the plurality of captured surface data frame sequences may be captured (e.g., generated) by a different capture device in a plurality of capture devices disposed at different locations with respect to the real-world scene so as to capture the different views of the real-world scene. As such, communication facility 102 may receive data (e.g., captured surface data frame sequences) directly from the plurality of capture devices by, for example, requesting and receiving data transmitted by the capture devices or otherwise accessing or acquiring the data from the capture devices. In other examples, one or more other systems (e.g., a real-world scene capture system) may intermediate between the capture devices and system 100 such that communication facility 102 may receive the captured surface data frame sequences by way of the one or more other systems.

Additionally or alternatively, communication facility 102 may provide data (e.g., virtualized surface data frame sequences or other data received and/or generated by system 100) to other server-side systems in a virtual reality media content provider pipeline and/or to client-side media player devices used by end users. As used herein, "server-side" may refer to a server side (e.g., a provider's side) of a server-client transaction such as a transaction where a content provider system provides content (e.g., virtual reality media content) to a client device used by an end user. For example, as will be described in more detail below, a virtual reality media content provider system may provide virtual reality media content to a media player device associated with a user. As such, server-side systems and components may refer to those systems and components that are associated with (e.g., included within, implemented by, interoperate with, etc.) the content provider system to provide data (e.g., virtual reality media content) to the media player device (e.g., by way of a network). In contrast, "client-side" devices may be associated with the client device (e.g., the media player device) used by the user on the other side of the network, and may include devices that facilitate the client device with receiving the data from the content provider system (e.g., the media player device and/or other computer components operated by the user on the user's side of the network).

Communication facility 102 may be configured to communicate with server-side and/or client-side systems using any communication interfaces, protocols, and/or technologies as may serve a particular implementation. For example, communication facility 102 may be configured to communicate by way of one or more networks (e.g., wired or wireless local area networks, wide area networks, provider networks, the Internet, etc.), wired communication interfaces (e.g., Universal Serial Bus ("USB")), wireless communication interfaces, or any other suitable communication interfaces, protocols, and/or technologies.

Surface data frame sequence management facility 104 may include one or more physical computing components (e.g., hardware and/or software components separate from those of communication facility 102 or shared with communication facility 102) that perform various operations associated with organizing, synchronizing, maintaining, tracking, and/or otherwise managing surface data frame sequences that have been received or generated by system 100 and respective sets of capture parameters associated with the surface data frame sequences. For example, surface data frame sequence management facility 104 may maintain sets of capture parameters associated with captured surface data frame sequences (e.g., surface data frame sequences captured by capture devices and received by communication facility 102 as described above) and/or may identify (or facilitate identifying) one or more additional sets of capture parameters distinct from the sets of capture parameters associated with the captured surface data frame sequences. For instance, surface data frame sequence management facility 104 may identify one or more sets of capture parameters associated, respectively, with one or more customized views of the real-world scene distinct from the different views of the real-world scene captured by the plurality of capture devices. Surface data frame sequence management facility 104 may further perform other operations described herein and/or as may serve a particular implementation of system 100.

Virtualized projection generation facility 106 may include one or more physical computing components (e.g., hardware and/or software components separate from those of facilities 102 and/or 104 or shared with facilities 102 and/or 104) that perform various operations associated with preparing, forming, rendering, or otherwise generating virtualized projections of views (e.g., customized views) of a real-world scene and/or data associated therewith. For example, virtualized projection generation facility 106 may render color and depth frames for a virtualized projection of a customized view of the real-world scene. More specifically, for instance, virtualized projection generation facility 106 may render the color and depth frames based on at least one of the surface data frame sequences received by communication facility 102 and further based on an additional set of capture parameters identified by surface data frame sequence management facility 104. Virtualized projection facility 106 may also generate a virtualized surface data frame sequence based on (e.g., that includes) the rendered color and depth frames for the virtualized projection. Once the virtualized surface data frame sequence is generated, virtualized projection facility 106 may provide the surface data frame sequence for inclusion within virtual reality media content for a media player device associated with a user. Alternatively, as mentioned above, the virtualized surface data frame sequence may be provided for inclusion within the virtual reality media content by communication facility 102 in certain implementations. Virtualized projection facility 106 may further perform other operations described herein and/or as may serve a particular implementation of system 100.

Storage facility 108 may store and/or maintain any suitable data received, generated, managed, tracked, maintained, used, and/or transmitted by facilities 102 through 106 in a particular implementation. For example, as shown, storage facility 108 may include surface data frame sequence data 110 and/or capture parameter data 112 that may be received, generated, managed, tracked, maintained, used, and/or transmitted (e.g., provided to other systems) in any of the ways described herein. Additionally, storage facility 108 may include other types of data used by particular implementations of system 100 such as instructions (e.g., programming instructions) for performing the operations described herein and/or other data used by facilities 102 through 106 to perform the operations described herein. Storage facility 108 may be implemented in any of the ways described herein and may include hardware and/or software for any transitory or non-transitory modes of storing data including, but not limited to, random access memory ("RAM"), non-transitory storage (e.g., disk storage, flash memory storage, etc.), and the like.

In some examples, system 100 may perform one or more of the operations described herein in real time as events are occurring within the real-world scene. Accordingly, in implementations where system 100 is used within a virtual reality media content provider pipeline in which other systems also operate in real time, virtual reality media content (e.g., virtual reality media content including virtualized surface data frame sequences generated by system 100 in real time) may be provided to media player devices such that respective users of the media player devices, who may not be physically located near the real-world scene but who may wish to experience the real-world scene (e.g., the events occurring within the real-world scene), may virtually experience the real-world scene and the events occurring therein live (e.g., in real time as the events are occurring) using their respective media player devices. While data processing and data distribution may take a finite amount of time such that it may be impossible for a user to experience the real-world scene precisely as events within the real-world scene occur, as used herein, an operation is considered to be performed in "real time" when the operation is performed immediately and without undue delay. Accordingly, a user may be said to experience a real-world scene in real time even if the user experiences particular events within the real-world scene after a delay (e.g., a few seconds or minutes after the occurrences actually take place).

As described above, in certain implementations, system 100 may generate data representative of a relatively large number of virtualized projections. This data may provide flexibility as to how virtual reality media content (e.g., virtual reality media content that uses the data) may be generated and distributed to client-side media player devices. For example, by generating data representative of a large number of localized virtual projections of the real-world scene, detail relevant to one user's experience may be provided to the media player device associated with that user while not being provided to a media player device of another user for whom the detail is less relevant.

In one specific implementation of system 100, for instance, communication facility 102 may receive (e.g., in real time as events occur within a real-world scene) a plurality of captured surface data frame sequences each including color and depth frames depicting the real-world scene in accordance with a respective set of capture parameters included in a first plurality of sets of capture parameters associated with different views of the real-world scene. As described above, each surface data frame sequence in the plurality of captured surface data frame sequences may be captured by a different capture device in a plurality of capture devices disposed at different locations with respect to the real-world scene so as to capture the different views of the real-world scene. In addition to the receiving of the captured surface data frame sequences, surface data frame sequence management facility 104 may identify a second plurality of sets of capture parameters distinct from the sets of capture parameters included in the first plurality of sets of capture parameters. For example, each set of capture parameters in the second plurality of sets of capture parameters may be associated with respective customized views of the real-world scene distinct from the different views of the real-world scene captured by the plurality of capture devices. For example, the second plurality of sets of capture parameters may include a relatively large number of sets of capture parameters (e.g., a greater number of sets than is included in the first plurality of sets of capture parameters). This identifying operation may also be performed in real time as the events occur within the real-world scene.

In response to the identifying of the second plurality of sets of capture parameters, virtualized projection generation facility 106 may render color and depth frames for virtualized projections of each respective customized view of the real-world scene based on the plurality of captured surface data frame sequences and based on the second plurality of sets of capture parameters. In some examples, virtualized projection generation facility 106 may package the rendered color and depth frames to be included within respective virtualized surface data frame sequences that may be transported by way of one or more transport streams or the like as will be described in more detail below. This rendering and/or data packaging may also be performed in real time as the events occur within the real-world scene. As such, communication facility 102 may provide (e.g., in real time as the events occur within the real-world scene) a plurality of virtualized surface data frame sequences including the rendered color and depth frames for the virtualized projections of each respective customized view of the real-world scene. For example, the plurality of virtualized surface data frame sequences may be provided for inclusion within virtual reality media content for a media player device (e.g., virtual reality media content configured to be streamed by way of a virtual reality media provider pipeline in real time to a media player device associated with a user experiencing the virtual reality media content).

Data representative of a real-world scene (e.g., surface data frame sequences received by system 100) may be captured by any suitable systems and/or devices arranged in any suitable configuration as may serve a particular implementation. For example, as mentioned above, each surface data frame sequence in the plurality of captured surface data frame sequences received by system 100 may be captured by a different capture device in a plurality of capture devices disposed at different locations with respect to the real-world scene so as to capture different views of the real-world scene.

Figure 2:
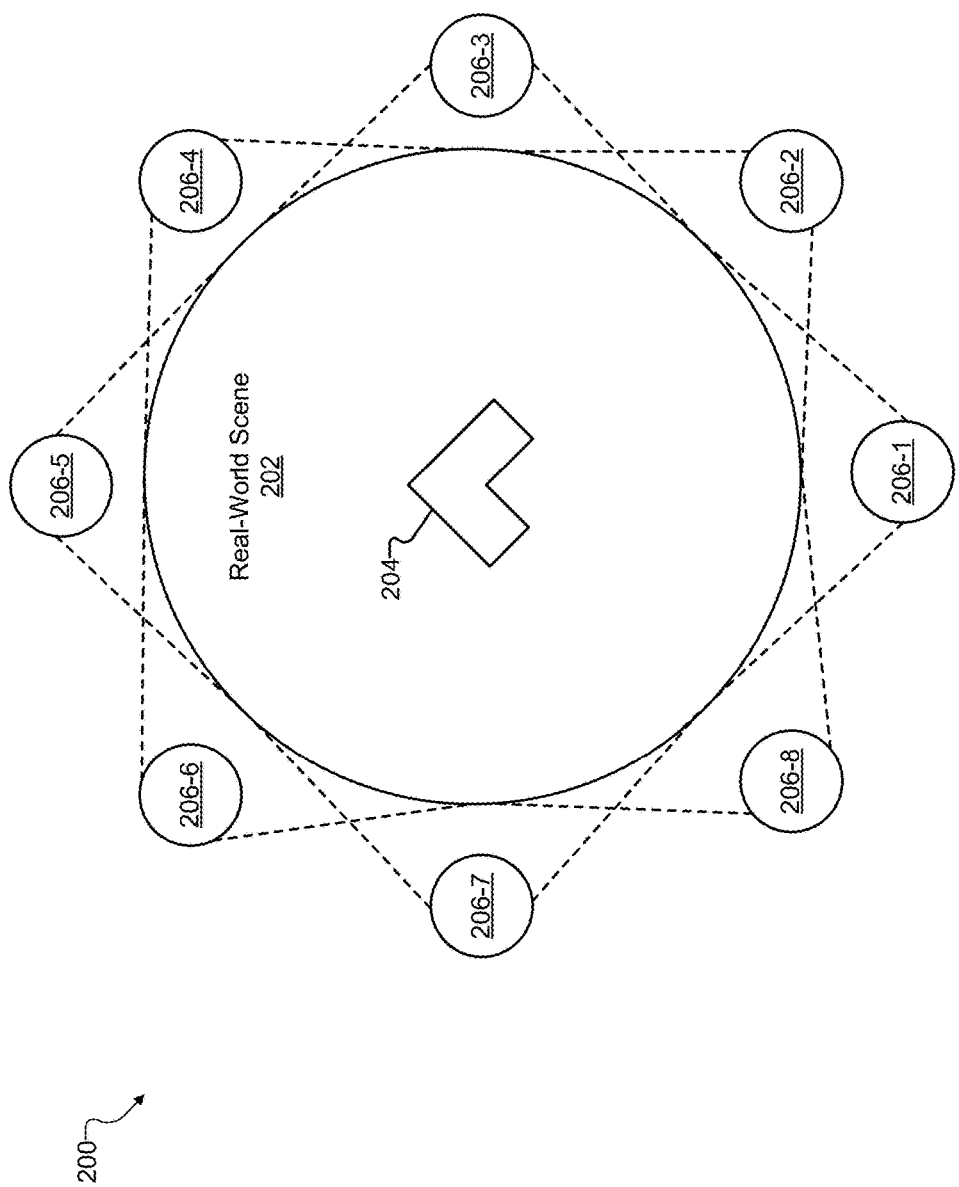
FIG. 2 illustrates an exemplary configuration in which data representative of an exemplary real-world scene is captured from different views of the real-world scene according to principles described herein.

To illustrate, FIG. 2 shows an exemplary configuration 200 in which data representative of an exemplary real-world scene is captured from different views of the real-world scene. Specifically, as illustrated in configuration 200, a real-world scene 202 that includes a real-world object 204 may be surrounded by a plurality of views 206 (e.g., views 206-1 through 206-8) of real-world scene 202.

Real-world scene 202 may represent any real-world scenery, real-world location, real-world event (e.g., live event, etc.), or other subject existing in the real world (e.g., as opposed to existing only in a virtual world or an imaginary world) as may serve a particular implementation. As illustrated by the circle representing real-world scene 202 in FIG. 2, real-world scene 202 may be a specifically delineated area such as a stage, an arena, or the like. Conversely, in other examples, real-world scene 202 may not be so well defined or delineated. For example, real-world scene 202 may include any indoor or outdoor real-world location such as a city street, a museum, a scenic landscape, or the like. In certain examples, real-world scene 202 may be associated with a real-world event such as a sporting event, a musical event, a dramatic or theatrical presentation, a large-scale celebration (e.g., New Year's Eve on Times Square, Mardis Gras, etc.), a political event, or any other real-world event. In the same or other examples, real-world scene 202 may be associated with a setting for a fictionalized scene (e.g., a set of a live-action virtual reality television show or movie) and/or any other scene at any other indoor or outdoor real-world location as may serve a particular implementation.

Accordingly, real-world object 204 may represent any real-world object, whether living or inanimate, that is associated with real-world scene 202 (e.g., located within or around real-world scene 202) and that is detectable (e.g., viewable, etc.) from at least one of views 206. While real-world object 204 is drawn as a relatively simple geometric shape for the sake of clarity, it will be understood that real-world object 204 may represent various types of objects having various levels of complexity. Rather than a geometric shape, for instance, real-world object 204 could represent any animate or inanimate object or surface, such as a person or another living thing, a non-transparent solid, liquid, or gas, a less discrete object such as a wall, a ceiling, a floor, or any other type of object described herein or as may serve a particular implementation.

Real-world object 204 may include various surfaces that may each reflect light (e.g., ambient light in real-world scene 202, infrared light in a structured light pattern emitted by a depth capture device, etc.) to be detected by capture devices disposed at different locations with respect to real-world scene 202 so as to capture real-world scene 202 from views 206. While real-world object 204 is depicted to be relatively simple, the depth and/or appearance of the surfaces of real-world object 204 may appear different based on which view 206 of real-world scene 202 the surfaces are detected from, as will be illustrated below. In other words, real-world object 204 may look different based on a perspective (e.g., position, vantage point, etc.) from which real-world object 204 is viewed.

As mentioned above, views 206 of real-world scene 202 may provide different perspectives, vantage points, etc. from which real-world scene 202 (e.g., including real-world object 204) may be viewed. As will be described below, using color and depth data of real-world scene 202 captured from various different views 206 (e.g., views 206 that surround real-world scene 202 in order to capture real-world scene 202 from various perspectives), system 100 may be able to generate a virtualized projection of any arbitrary view of real-world scene 202. In other words, using color and depth data captured from one or more of views 206, system 100 may render color and depth data for a virtualized projection of a customized view of real-world scene 202 (e.g., an arbitrary view of real-world scene 202 from a location, orientation, etc., distinct from views 206).

Views 206 may each be fixed with respect to real-world scene 202. For example, both real-world scene 202 and views 206 may be stationary, or real-world scene 202 and views 206 may be in motion together. In some examples, such as shown in configuration 200, views 206 may surround real-world scene 202 along at least two dimensions associated with real-world scene 202 (e.g., along a plane such as the ground). In certain examples, views 206 may surround real-world scene 202 along three dimensions (e.g., by including views 206 above and below real-world scene 202 as well).

As illustrated by the different positions surrounding real-world scene 202 at which views 206 are disposed, each view 206 may be associated with a particular location with respect to real-world scene 202. Additionally, views 206 may further be associated with other aspects of how real-world scene 202 is to be captured. For example, as illustrated by dotted lines emanating from each view 206, views 206 may be associated with particular capture orientations (e.g., particular directions that the capture devices corresponding to views 206 are facing), particular fields of view of capture (e.g., areas of real-world scene 202 that are captured by the capture devices based on, for example, how narrow- or wide-angle the lenses of the capture devices are, the zoom level of the capture device, etc.), and the like. Each view 206 may further be associated with aspects of capture that are not explicitly illustrated in FIG. 2. For instance, each view 206 may be associated with a particular quality level (e.g., image resolution, frame rate, etc.) at which data is captured by a capture device associated with the view 206, a particular format with which data captured by the capture device is to be encoded, and/or any other aspects of data capture as may serve a particular implementation.

In some examples, as shown in configuration 200, vantage points (e.g., orientations, fields of view, etc.) associated with each view 206 may be angled inwardly toward real-world scene 202 so as to capture real-world scene 202 from enough perspectives to be able to later recreate real-world scene 202 from customized views that may be unaligned with views 206. Additionally, in the same or other examples, one or more of the vantage points associated with views 206 may be angled outwardly (i.e., away from real-world scene 202) to capture data representative of objects surrounding real-world scene 202 or the like. For instance, a 360-degree capture device with a spherical, outward facing vantage point may be placed at a position in the middle of real-world scene 202 (not explicitly shown) to capture objects included within real-world scene 202 from additional perspectives and/or to capture devices outside of real-world scene 202. Additionally or alternatively, in certain examples, a plurality of outward facing views may allow for capture of a panoramic, wide angle, or 360-degree view of a real-world scene.

In order to capture real-world scene 202 from the perspectives of each view 206, a different capture device in a plurality of capture device may be disposed at each different location of views 206. To illustrate, FIG. 3A shows an exemplary capture device 302 capturing color and depth frames for inclusion within a surface data frame sequence representative of real-world scene 202.

Figure 3A:
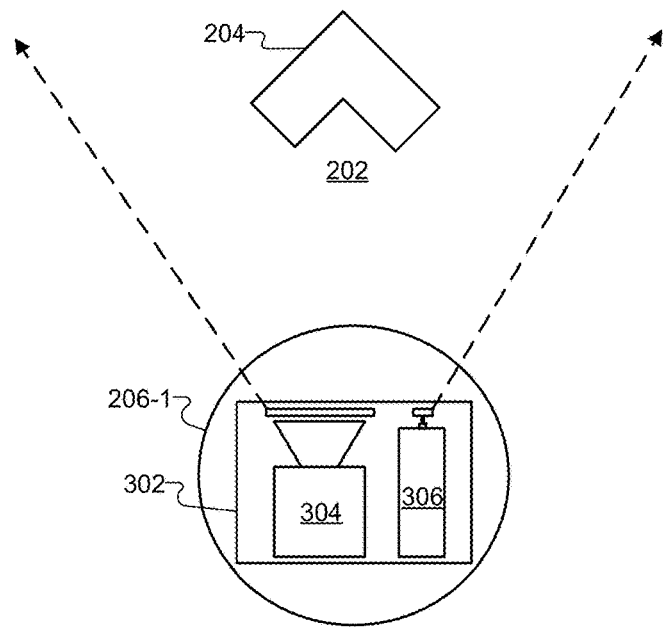
FIG. 3A illustrates an exemplary capture device capturing color and depth frames for inclusion within a surface data frame sequence representative of the real-world scene of FIG. 2 according to principles described herein.

As shown in FIG. 3A, capture device 302 may be associated with view 206-1 and, as such, may be disposed with respect to real-world scene 202 and real-world object 204 at the location corresponding to view 206-1. FIG. 3A illustrates that capture device 302 may include a two-dimensional ("2D") color capture device 304 configured to capture color data (e.g., 2D video data representative of full color or grayscale images) representative of real-world scene 202 (e.g., including real-world object 204 and/or other objects included therein), and a depth capture device 306 configured to capture depth data representative of real-world scene 202.

2D color capture device 304 may be implemented by any suitable 2D color capture device (e.g., a camera, a video camera, etc.) and may capture 2D color data in any manner as may serve a particular implementation. In some examples, 2D color capture device 304 may be a separate device from depth capture device 306. Collectively, such separate devices (e.g., as well as any communication interfaces and/or other hardware or software mechanisms used to functionally merge the devices) may be referred to as a capture device (e.g., capture device 302). In other examples, as shown in FIG. 3A, 2D color capture device 304 and depth capture device 306 may be integrated into a single device (i.e., capture device 302) that captures both color data and depth data as will be described.

Whether implemented as a separate device or integrated with 2D color capture device 304, depth data capture device 306 may capture depth data representative of real-world scene 202 in any manner as may serve a particular implementation. For instance, depth data capture device 306 may employ one or more depth map capture techniques such as a structured light depth map capture technique, a stereoscopic depth map capture technique, a time-of flight depth map capture technique, another suitable depth map capture technique, or any combination of depth map capture techniques as may serve a particular implementation.

Regardless of the type and number of depth map capture techniques used to capture depth data, capture device 302 may capture both color data (e.g., color frames) and depth data (e.g., depth frames) representative of the surfaces of real-world object 204 and/or other objects included within real-world scene 202 from view 206-1. As used herein, a color frame and a depth frame that are captured at approximately the same time by capture device 302 may be collectively referred to as a "surface data frame" or a "color and depth frame" because the data included in these frames represents data describing the surfaces (i.e., both the visible appearance of the surfaces as well as the depth geometries of the surfaces) of real-world objects included in a real-world scene.

Accordingly, as used herein, a surface data frame or a color and depth frame may refer to a dataset that represents various types of data associated with surfaces of real-world objects visible within a real-world scene from a particular view of the real-world scene at a particular point in time. For example, a surface data frame may include color data (i.e., image data) as well as depth data representative of the objects as viewed from a particular view with respect to the real-world scene. As such, a plurality of related surface data frames may be sequenced together to create a video-like representation (representing not only color but also depth data) of the real-world scene as viewed from the particular view. In certain examples, a surface data frame may further be associated with other types of data such as audio data, metadata (e.g., metadata including a set of capture parameters describing the view from which the surface data frame is captured, information about specific real-world objects represented in the surface data frame, etc.), and/or other types of data as may serve a particular implementation. As will be described and illustrated below, such a sequence of surface data frames may be referred to herein as a "surface data frame sequence."

As used herein, "color data" may broadly include any image data, video data, or the like, whether represented in color or grayscale (i.e., "black and white"), that represents the appearance of a subject (e.g., a real-world object included within a real-world scene) at a particular point in time or over a particular time period from the perspective of a particular view. Color data is not limited to any particular format, file type, frame rate, resolution, quality level, or other characteristic that may be associated with various definitions and/or standards defining image data and/or video data in the art. Similarly, as used herein, "depth data" may include any data representative of a position and/or geometry of a subject in space. For example, depth data representative of a real-world object may include coordinates with respect to a coordinate system (e.g., a coordinate system associated with a particular capture device, a global coordinate system associated with the real-world scene, etc.) for different points on the surfaces of the real-world object.

As with capture device 302, which captures color and depth frames from view 206-1, it will be understood that other capture devices may be associated with other views 206 (e.g., views 206-2 through 206-8 in FIG. 2) to likewise capture color and depth frames from the respective vantage points associated with the other views 206. In some examples, surface data frames may be captured by the different capture devices associated with the different views 206 at a same particular point in time so as to be synchronous with one another. As used herein, surface data frames may be said to be captured "at a same particular point in time" when the surface data frames are captured close enough in time so as to effectively represent a subject (e.g., a real-world object within a real-world scene) at a moment in time (i.e., as opposed to representing the subject over a range of time), even if the surface data frames are not captured at precisely the same instant. For instance, depending on how dynamic a particular subject is (e.g., how fast one or more real-world objects move through a real-world scene or the like), surface data frames may be considered to be captured at the same particular point in time when captured within, for example, several tens or hundreds of milliseconds of one another, or when captured within another suitable timeframe (e.g., within microseconds, milliseconds, seconds, etc.) as may serve a particular implementation. As such, each of the surface data frames may be representative of color data and depth data of surfaces of a real-world object included within the real-world scene as the surfaces appear, at the particular point in time, from the respective vantage point of the view 206 with which the respective capture device is associated.

Figure 3B:
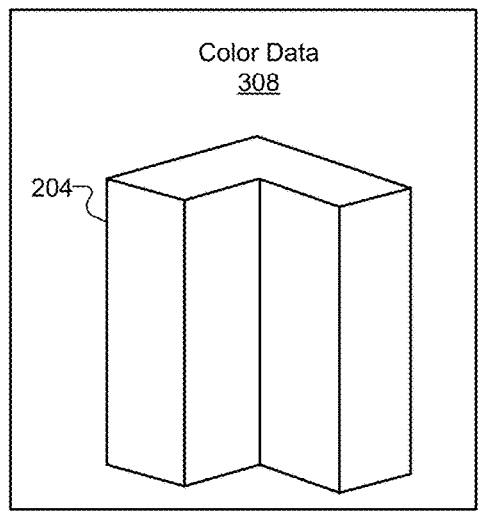
FIG. 3B illustrates an exemplary graphical depiction of color data represented in a color frame captured by the capture device of FIG. 3A according to principles described herein.
Figure 3C:
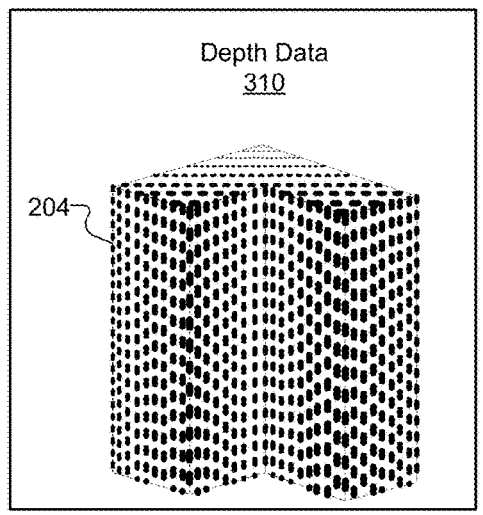
FIG. 3C illustrates an exemplary graphical depiction of depth data represented in a depth frame captured by the capture device of FIG. 3A according to principles described herein.

FIGS. 3B and 3C illustrate exemplary graphical depictions of data captured by capture device 302 and included within color and depth frames (i.e., within a surface data frame). Specifically, as shown, a color frame incorporated into the surface data frame may include color data 308 (shown in FIG. 3B), while a depth frame incorporated into the surface data frame may include depth data 310 (shown in FIG. 3C).

In FIG. 3B, color data 308 depicts real-world scene 202 (e.g., including real-world object 204) as viewed from the perspective of view 206-1 by 2D color capture device 304 within capture device 302. Because color data 308 may represent a single video frame in a sequence of video frames, the depiction of real-world object 204 represented by color data 308 may represent how real-world object 204 (e.g., as well as other objects associated with real-world scene 202) appeared from the vantage point of view 206-1 at a particular point in time. While illustrated as an image in FIG. 3B, it will be understood that color data 308 may be captured, encoded, formatted, transmitted, and represented in any suitable form. For example, color data 308 may be digital data that is formatted according to a standard video encoding protocol, a standard image format, or the like. In some examples, color data 308 may represent a color image (e.g., similar to a color photograph) of the objects in real-world scene 202. Alternatively, in other examples, color data 308 may be a grayscale image representative of the objects (e.g., similar to a black and white photograph).

In FIG. 3C, depth data 310 also (like color data 308) depicts real-world scene 202 (including real-world object 204) from the perspective of view 206-1. However, rather than representing the visible appearance of the objects within real-world scene 202 (e.g., representing in color or grayscale how light interacts with the surfaces of real-world object 204), depth data 310 may represent the depth (i.e., the distance or position) of each point on the surface of the objects (e.g., real-world object 204 as well as other objects within real-world scene 202) relative to, for example, depth capture device 306 in capture device 302. As with color data 308, depth data 310 may be captured, encoded, formatted, transmitted, and represented in any suitable form. For example, as shown, depth data 310 may be represented by grayscale image data (e.g., six or eight bits for each pixel captured by depth capture device 306). However, rather than representing how light reflects from the surfaces of real-world object 204 (i.e., as represented in color data 308), the grayscale image of depth data 310 may represent, for each pixel in the image, how far away the point represented by that pixel is from depth capture device 306. For example, points that are closer to depth capture device 306 may be represented with values that represent darker shades of gray (e.g., binary values closer to 0b111111 in the case of a six-bit implementation where 0b111111 represents black). Conversely, points that are farther away from depth capture device 306 may be represented with values that represent lighter shades of gray (e.g., binary values closer to 0b000000 in the case of the six-bit implementation where 0b000000 represents white).

In certain examples, system 100 (e.g., communication facility 102) may be communicatively coupled to capture device 302 and other capture devices associated with other views 206 by way of one or more networks and/or any other suitable communication interfaces, protocols, and technologies. Accordingly, in these examples, communication facility 102 may receive the captured surface data frame sequences directly from the capture devices by way of the one or more networks and/or other communication interfaces, protocols, and technologies. In other examples, a real-world scene capture system separate from system 100 may be communicatively coupled with each of the capture devices and may be configured to manage the capture of surface data frames by each of the capture devices and to provide the surface data frame sequences to system 100 (e.g., after synchronizing and/or otherwise processing the surface data frame sequences). Regardless, the communications between the capture devices, system 100, and/or an intermediate real-world scene capture system may be implemented by way of a network (e.g., a wired or wireless local area network, a wide area network, a provider network, the Internet, etc.), by way of a wired communication interface (e.g., Universal Serial Bus ("USB")), by way of a wireless communication interface, or by way of any other communication interface, protocol, and/or technology as may serve a particular implementation.

In other examples, the plurality of capture devices may be integrated within or otherwise included as part of system 100 (e.g., as part of surface data frame sequence management facility 104 or another facility of system 100). As such, in these examples, surface data frame sequence management facility 104 may receive the surface data frame sequences by capturing the surface data frame sequences using the integrated capture devices.

Figure 4A:
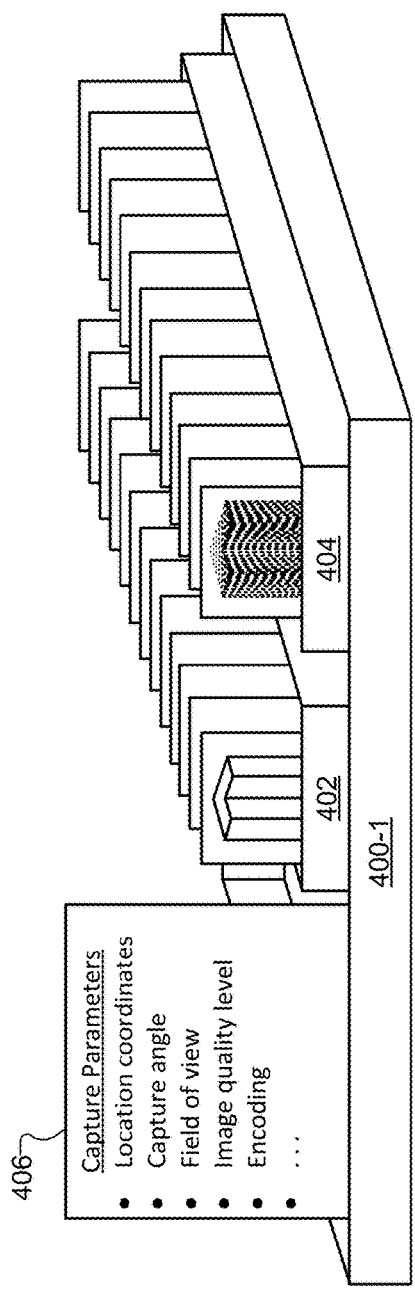
FIGS. 4A and 4B illustrate different representations of an exemplary surface data frame sequence representative of the real-world scene of FIG. 2 and generated by the capture device of FIG. 3A according to principles described herein.
Figure 4B:
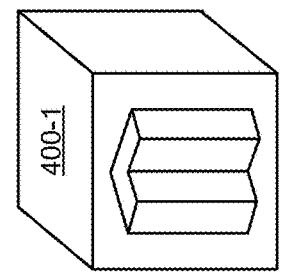

FIGS. 4A and 4B illustrate an exemplary surface data frame sequence 400-1 representative of real-world scene 202 (e.g., from the perspective of view 206-1) as generated by capture device 302. Specifically, FIG. 4A shows a detailed graphical view of surface data frame sequence 400-1 depicting certain specific data that may be included in surface data frame sequence 400-1, while FIG. 4B shows a consolidated graphical view of surface data frame sequence 400-1 that does not specifically depict many details of the content of surface data frame sequence 400-1.

As shown in FIG. 4A, surface data frame sequence 400-1 may include various types of data including color data, depth data, and metadata. Specifically, surface data frame sequence 400-1 is shown to include a color frame sequence 402, a depth frame sequence 404, and a set of capture parameters 406. It will be understood that surface data frame sequence 400-1 may further include other types of data (e.g., captured audio data, other metadata besides the set of capture parameters 406, etc.) not explicitly shown in FIG. 4A. Additionally, it will be understood that the data included within surface data frame sequence 400-1 may be arranged or formatted in any suitable way. For example, as shown, the data included within surface data frame sequence 400-1 may be arranged as one color frame sequence and one depth frame sequence. In other examples, a single capture device may output multiple color frame sequences and/or multiple depth frame sequences (e.g., to cover different parts of the field of view of the real-world scene being captured). In yet other examples, the data of surface data frame sequence 400-1 may be arranged as a sequence of integrated surface data frames each including a particular color frame, a particular depth frame, and certain metadata (e.g., data representative of the set of capture parameters 406), or in other ways as may serve a particular implementation.

The data included within each color frame of color frame sequence 402 may be similar to color data 308, described above in relation to FIG. 3. However, each color frame within color frame sequence 402 may be captured at slightly different times such that color frame sequence 402 may form a video-like representation of real-world scene 202 from view 206-1. Similarly, the data included within each depth frame of depth frame sequence 404 may be similar to depth data 310 except that each depth frame within depth frame sequence 404 may be captured at slightly different times (e.g., times synchronous with the times at which the color frames of color frame sequence 402 are captured) such that depth frame sequence 404 may form another video-like representation of real-world scene 202 from view 206-1.

The set of capture parameters 406 included within surface data frame sequence 400-1 may include metadata describing the view from which surface data frame sequence 400-1 is captured (i.e., in this case view 206-1). For example, the set of capture parameters 406 may include various parameters indicating various aspects of where and/or how the surface data frames included within surface data frame sequence 400-1 have been captured. The capture parameters included within the set of capture parameters 406 may include any suitable capture parameters associated with the respective view of the real-world scene as may serve a particular implementation.

For example, the set of capture parameters 406 may include a capture parameter representative of a location with respect to real-world scene 202 from which color and depth frames corresponding to view 206-1 of real-world scene 202 are captured. As another example, the set of capture parameters 406 may include a capture parameter representative of an orientation (e.g., a capture orientation associated with different angles in different dimensions at which a capture device is pointing) from which the color and depth frames corresponding to view 206-1 of real-world scene 202 are captured. Similarly, as another example, the set of capture parameters 406 may include a capture parameter representative of a field of view with which the color and depth frames corresponding to view 206-1 of real-world scene 202 are captured. Additionally, as yet another example, the set of capture parameters 406 may include a capture parameter representative of an image quality with which the color and depth frames corresponding to view 206-1 of real-world scene 202 are captured. In still other examples, the set of capture parameters 406 may include any other suitable capture parameters representative of other aspects by which the color and depth frames corresponding to view 206-1 of real-world scene 202 may be captured. For instance, the set of capture parameters 406 may include parameters representative of a depth mapping and/or a depth range by which depth frames corresponding to view 206-1 are captured, parameters representative of a particular encoding, format, frame rate, dynamic range, or the like with which the color and depth frames corresponding to view 206-1 are captured, a source of the capture (e.g., identification information for a capture device that captures the color and depth frames corresponding to view 206-1), or other suitable parameters.

The set of capture parameters 406 may be represented and integrated with the other data included within surface data frame sequence 400-1 in any manner as may serve a particular implementation. For example, while some implementations may represent capture parameters 406 explicitly in data (e.g., variables, etc.) representative of the capture parameters, other implementations may represent capture parameters 406 implicitly in the format in which orientation, location, and/or projection information (e.g., field of view and depth mappings for perspective frame sequences, left/right/top/bottom/near/far for orthographic frame sequences, etc.) are represented. Data representative of certain capture parameters 406 may be combined, for instance, into a single, abstract matrix (e.g., a 4×4 matrix) that represents the full transform from a particular image space to homogeneous coordinates of a world space. As such, in this example, individual components may not be specified explicitly but may rather be included within a more general transform.

Additionally, in some examples, the set of capture parameters 406 may be integrated with (e.g., repeated for) each color frame and/or depth frame included, respectively, within color frame sequence 402 and depth frame sequence 404. In other examples, the set of capture parameters 406 may be integrated with each individual surface data frame (e.g., combination color and depth frame). In these ways, the set of capture parameters 406 may flexibly describe the capture parameters for each and every frame, even if views 206 dynamically change during the time period represented by surface data frame sequence 400-1. In other examples, the set of capture parameters 406 may be static throughout the time period represented by surface data frame sequence 400-1. In these examples, the set of capture parameters 406 may be transmitted separately from the frames of frame sequences 402 and 404. For example, the set of capture parameters 406 may be transmitted separately from the transmission of the color and depth frames such as prior to the transmission of the color and depth frames, at the start of the transmission of the color and depth frames, after the transmission of the color and depth frames, and/or at another suitable time.

As mentioned above, FIG. 4B illustrates a consolidated graphical view of surface data frame sequence 400-1. Specifically, the view of surface data frame sequence 400-1 in FIG. 4B shows surface data frame sequence 400-1 as a block with a depiction of real-world scene 202 (i.e., including real-world object 204) on the front of the block as viewed from a particular view (i.e., view 206-1). This type of surface data frame sequence view will be useful in illustrating additional surface data frame sequences in figures described below. However, it will be understood that any surface data frame sequence represented using a consolidated graphical view such as shown in FIG. 4B may include all of the same types of data shown and/or described in connection with FIG. 4A in any of the arrangements described above.

Based on one or more of surface data frame sequences 400 (e.g., surface data frame sequence 400-1 shown explicitly in FIG. 4 and other similar surface data frame sequences not explicitly shown in FIG. 4 such as a surface data frame sequence 400-2 corresponding to view 206-2, a surface data frame sequence 400-3 corresponding to view 206-3, and so forth), system 100 may render color and depth frames for a virtualized projection of a customized view of real-world scene 202. For example, system 100 may identify an additional set of capture parameters (e.g., a set distinct from the sets of capture parameters associated with surface data frame sequences 400) that is associated with a customized view of real-world scene 202 (e.g., a view distinct from views 206 illustrated in FIG. 2), and may render color and depth frames for a virtualized projection of the customized view based on at least one of surface data frame sequences 400 and based on the additional set of capture parameters.

As used herein, a "customized view" of a real-world scene may refer to any view of the real-world scene that is distinct from views associated with physical capture devices that capture data representative of the real-world scene. For instance, a customized view may be customized for a location within the real-world scene near where a particular real-world object is located (e.g., to provide improved depth resolution or depth accuracy on the real-world object), for a location within the real-world scene where no capture device is positioned, for a different orientation than may be provided by any view associated with a capture device, for a different field of view (e.g., a field of view associated with a different zoom level, a wider- or narrower-angle lens, etc.) than may be provided by any view associated with a capture device, a different level of detail (e.g., image resolution, etc.) than may be provided by any view associated with a capture device, or the like. Accordingly, as used herein, a "virtualized projection" of a customized view of a real-world scene may refer to data representative of a projection (e.g., a perspective projection, an orthographic projection, etc.) associated with the customized view. For instance, in certain examples, a virtualized projection may include a perspective projection that virtually simulates data that would be captured by a physical capture device if such a capture device were to be associated with the customized view (i.e., if the capture device were to capture data with the set of capture parameters that define the customized view). As another example, a virtualized projection may include a non-perspective projection (e.g., an orthographic projection, etc.) that is not generated by simulation of a virtual capture device but, rather, is generated by a depth peeling technique or other suitable technique for generating depth data as may serve a particular implementation.

As described above, virtualized projections of customized views may provide new perspectives on aspects of a real-world scene, added flexibility for improved depth resolution, and various other benefits not available without virtualized projections. It will be understood, however, that virtualized projections may be based on data captured by physical capture devices and, as such, may not provide any additional data that has not been captured by the physical capture devices. For example, while virtualized projections may be associated with customized views of the real-world scene where physical capture devices are not located, virtualized projections may not provide any new information that is not already available from views where physical capture devices are located.

In certain examples, the customized view of real-world scene 202 may be aligned with a particular capture device being used to capture data representative of real-world scene 202. For instance, the additional set of capture parameters associated with (e.g., defining) the customized view of real-world scene 202 may include one or more capture parameters that call for data captured by only one capture device (e.g., that call for a subset of the data captured by the capture device).

For example, the additional set of capture parameters may include a capture parameter representative of a customized field of view associated with the customized view of real-world scene 202, where the customized field of view is narrower than a captured field of view associated with the surface data frame sequence captured by the capture device. For instance, the additional set of capture device parameters may call for a cropped (i.e., zoomed in) portion of the data captured by a particular physical capture device.

As another example of a capture parameter that calls for data captured by only one capture device, the additional set of capture parameters may include a capture parameter representative of a customized image quality associated with the customized view of real-world scene 202, where the customized image quality is lower than a captured image quality associated with the surface data frame sequence captured by the capture device. For instance, the additional set of capture parameters may call for a lower resolution version of the data captured by a particular physical capture device.

In other examples, the customized view of real-world scene 202 may be unaligned with the different views of real-world scene 202 captured by the plurality of capture devices disposed at the different locations with respect to real-world scene 202 (i.e., the capture devices associated with views 206). As such, the rendering of the color and depth frames for the virtualized projection of the customized view of real-world scene 202 may include rendering color and depth frames based on at least two surface data frame sequences 400. As with the examples described above in which virtualized projections are based on data from single capture devices, the additional set of capture parameters in these examples may include capture parameters calling for narrowed fields of view, lowered image qualities, and the like, with respect to the captured surface data frame sequences. However, the additional set of capture parameters in examples in which virtualized projections are based on data from multiple capture devices may further call for customized locations, customized orientations, and the like, that may be distinct from any actual locations, orientations, etc., from which data is captured by physical capture devices.

Figure 5:
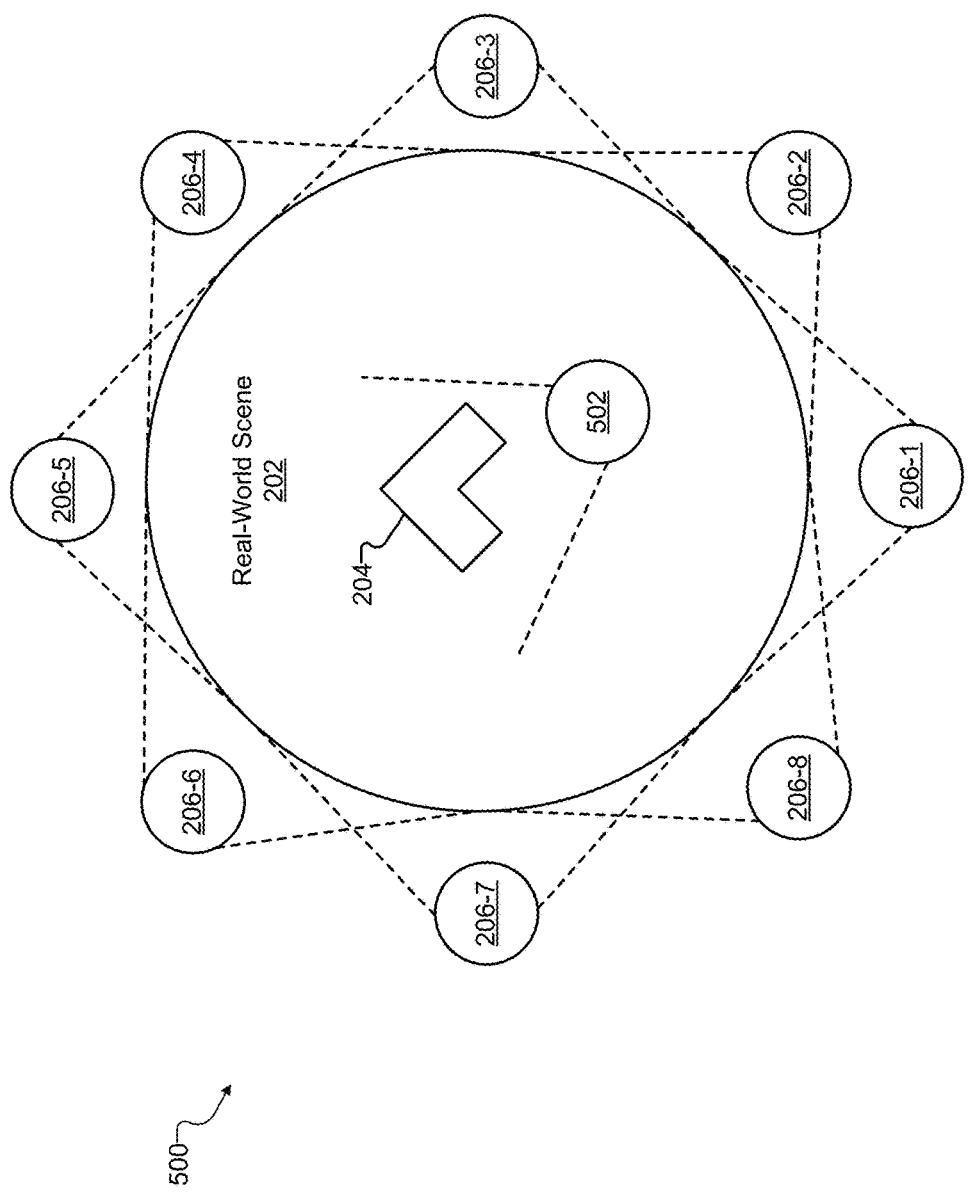
FIG. 5 illustrates an exemplary configuration based on the configuration of FIG. 2 in which data representative of the real-world scene of FIG. 2 is additionally generated for a customized view of the real-world scene according to principles described herein.

To illustrate, FIG. 5 shows an exemplary configuration 500 that is based on configuration 200 (i.e., that includes all the same elements illustrated and described above in connection with configuration 200), but in which data representative of real-world scene 202 is additionally generated for a customized view 502 of real-world scene 202. Specifically, as shown in configuration 500, customized view 502 may be located within real-world scene 202 near real-world object 204 and with an orientation and field of view facing real-world object 204. While, as described above, certain customized views could be aligned with one of views 206 (e.g., located in the same location as one of views 206, providing the same orientation and/or field of view as one of views 206, etc.), customized view 502 in configuration 500 is shown to be unaligned with views 206. As used herein, a view is "unaligned" with another view if the views are distinct from one another with respect to the respective locations associated with the views, the respective orientations associated with the views, and/or the respective fields of view associated with the views. In the case of customized view 502 and views 206, for instance, customized view 502 is unaligned with all of views 206 because customized view 502 is disposed at a location distinct from any of views 206 (i.e., a location inside of real-world scene 202), has an orientation distinct from any of views 206 (i.e., an orientation between the respective orientations of views 206-1 and 206-2), and has a field of view distinct from any of views 206 (i.e., a field of view that provides a closer perspective on real-world object 204).

As such, based on an identification of an additional set of capture parameters that define customized view 502 and based on a plurality of surface data frame sequences 400 captured by the capture devices associated with views 206 (e.g., based on surface data frame sequences 400-1 and 400-2, for instance), system 100 may render color and depth frames for a virtualized projection of customized view 502 of real-world scene 202, and may provide a virtualized surface data frame sequence including these color and depth frames.

Figure 6:
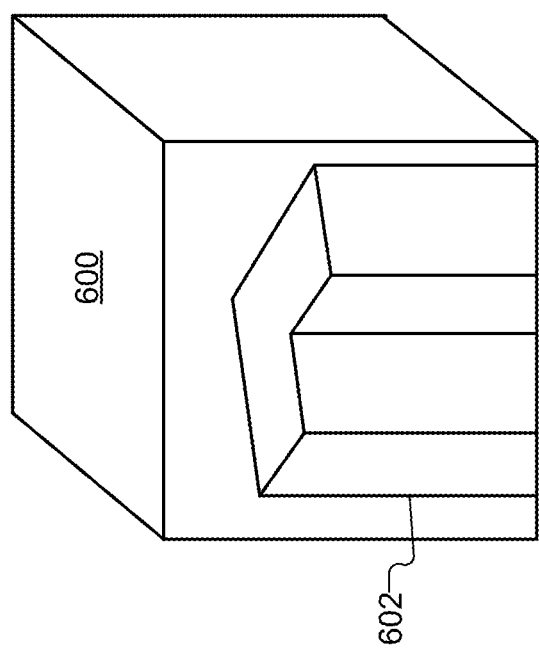
FIG. 6 illustrates an exemplary virtualized surface data frame sequence including color and depth frames for an exemplary virtualized projection of the customized view of the real-world scene of FIG. 5 according to principles described herein.

By way of illustration, FIG. 6 shows an exemplary virtualized surface data frame sequence 600 that may be generated and provided by system 100 for the virtualized projection of customized view 502. Specifically, virtualized surface data frame sequence 600 may be generated to include the rendered color and depth frames for a virtualized projection 602 of customized view 502. As illustrated by virtualized projection 602, the color and depth frames included within virtualized surface data frame sequence 600 may be associated with (e.g., may appear to have been captured from) a different location, a different orientation, and a different field of view than any of the color and depth frames included within surface data frame sequences 400.

Specifically, as shown, virtualized projection 602 represents a close-up from a particular orientation on real-world object 204. This may provide various advantages for downstream systems and devices that may provide virtual reality media content representative of real-world object 204 from the location, orientation, and/or field of view provided by virtualized projection 602. For example, in implementations where depth data is processed using processing resources (e.g., video codec solutions) that operate on a limited number of bits (e.g., 8 to 12 bits for an off-the-shelf video codec configured to process color data), depth quantization issues such as undesirable "layering" of depth data representing relatively large areas may be mitigated by using depth data that represents more localized areas. Localized areas may involve shorter depths represented by the available bits than large (e.g., less localized) areas, thus allowing the limited number of bits available to represent depths with a high degree of precision to reduce or eliminate layering effects and the like. As such, a bit depth with which surfaces of objects are represented (e.g., a number of bits used to represent depths at different distances from a vantage point) may be optimized for virtualized projection 602 to provide a high level of depth precision and/or depth resolution from the vantage point of virtualized projection 602.

While a particular additional set of capture parameters associated with a particular customized view (i.e., customized view 502) has been described and illustrated in detail with respect to FIGS. 5 and 6, it will be understood that a large number of sets of capture parameters associated with a large number of customized views (e.g., a number significantly larger than the number of physical capture devices employed to capture the data representative of real-world scene 202) may be identified in certain implementations to allow for the generation and providing of a large number of virtualized surface data frame sequences for possible inclusion within virtual reality media content. As described above, this large number of virtualized surface data frame sequences may allow for increased flexibility in the generation and distribution of virtual reality media content to provide different media player devices with different details about the same real-world scene without overwhelming any media player device with large amounts of redundant or relatively irrelevant data.

One or more additional sets of capture parameters (i.e., sets of capture parameters other than the sets of capture parameters associated with views 206) may be identified in any manner as may serve a particular implementation. For example, in certain implementations, an additional set of capture parameters such as the set of capture parameters associated with customized view 502 may be identified by analyzing real-world scene 202 with respect to one or more geometric properties of the real-world scene, generating (e.g., based on the analyzing of the real-world scene) a plurality of additional sets of capture parameters distinct from the sets of capture parameters associated with views 206, and identifying the additional set of capture parameters from the plurality of additional sets of capture parameters. Specifically, for instance, system 100 may determine geometric properties of real-world scene 202 such as properties associated with the shape of real-world scene 202, various parts of real-world scene 202 or manners in which real-world scene 202 may be divided up, the locations and/or trajectories of particular objects within real-world scene 202, and the like. Based on these and/or other properties, system 100 may determine that various customized views (e.g., including customized view 502) may be relevant for generating virtual reality media content, and, as a result, may generate respective sets of capture parameters for each of these relevant customized views.

Once a plurality of captured surface data frame sequences have been received for views of the real-world scene associated with physical capture devices and one or more virtualized surface data frame sequences have been generated for virtualized projections of customized views of the real-world scene, system 100 may provide one or more of the captured and/or the virtualized surface data frame sequences for inclusion within virtual reality media content. For example, as will be described in more detail below, system 100 may provide data in the captured and/or virtualized surface data frame sequences to server-side systems (e.g., downstream systems in a virtual reality media provider pipeline) and/or to client-side systems such as media player devices associated with users experiencing virtual reality media content (e.g., virtual reality media content based on the data included within the surface data frame sequences).

System 100 may provide the data (e.g., the color and depth frames, as well as other types of data such as audio data, metadata, and the like) included within the surface data frame sequences in any manner and to any other system or device as may serve a particular implementation. For example, in certain implementations, system 100 may provide color and data frames (as well as audio and metadata, etc.) to an encoding system that encodes the data to generate video data streams (e.g., compressed 2D video streams in standardized formats such as H.264, H.265, etc.). Thus, for example, the data included in a particular surface data frame sequence may be included in one or more video data streams such as in a color video data stream, a depth video data stream, and the like. Other data included within the surface data frame sequence (e.g., audio data, metadata, etc.) may also be included within the color video data stream and/or the depth video data stream or may be included within a different data stream.

Regardless of which system the surface data frame sequence data is to be provided to and/or whether the surface data frame sequence data has been encoded into one or more video data streams or the like, the surface data frame sequence data may be packaged and/or multiplexed for transport over a network. This data packaging may be performed in any suitable manner and/or using any suitable data structures as may serve a particular implementation. As one example, each surface data frame sequence may be packaged into its own unique transport stream. Specifically, for instance, virtualized surface data frame sequence 600 may be packaged such that the rendered color and depth frames for virtualized projection 602 of customized view 502 of real-world scene 202 are included within a transport stream that does not include color and depth frames representative of additional surface data frame sequences (e.g., additional captured or virtualized surface data frame sequences) other than virtualized surface data frame sequence 600.

As another example, multiple surface data frame sequences may be packaged together (e.g., multiplexed) into a shared transport stream. Specifically, for instance, virtualized surface data frame sequence 600 may be packaged such that the rendered color and depth frames for virtualized projection 602 of customized view 502 of real-world scene 202 are included within a transport stream that further includes color and depth frames representative of at least one additional surface data frame sequence (e.g., at least one additional captured or virtualized surface data frame sequence) other than virtualized surface data frame sequence 600.

Figure 7:
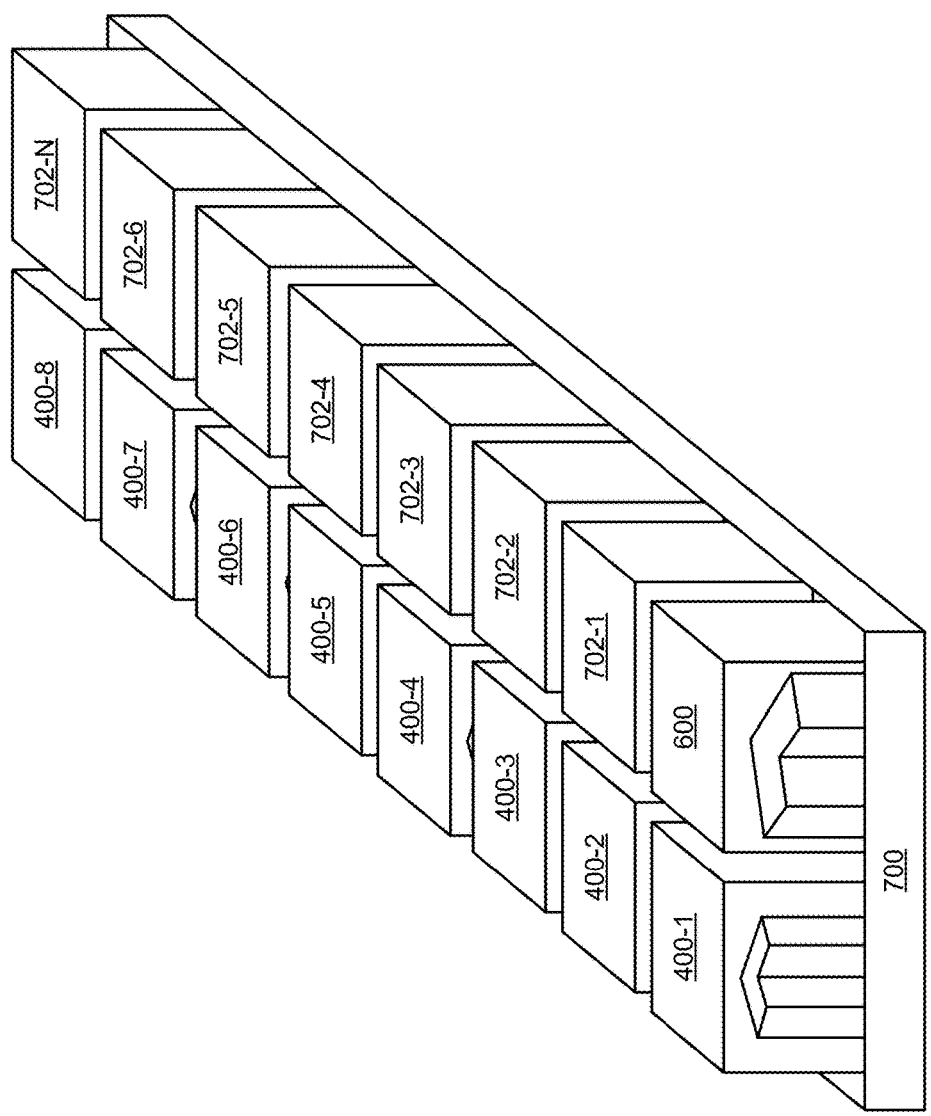
FIG. 7 illustrates a graphical representation of an exemplary transport stream that includes an exemplary plurality of surface data frame sequences according to principles described herein.

To illustrate, FIG. 7 shows a graphical representation of an exemplary transport stream 700 that includes an exemplary plurality of surface data frame sequences. Specifically, transport stream 700 may include various captured surface data frame sequences 400 (e.g., surface data frame sequence 400-1 shown in FIGS. 4A-4B and surface data frame sequences 400-2 through 400-8 that are similarly captured by capture devices associated with views 206-2 through 206-8, respectively) as well as various virtualized surface data frame sequences (e.g., virtualized surface data frame sequence 600 shown in FIG. 6 and other virtualized surface data frame sequences 702-1 through 702-N).

As used herein, "transport streams" may refer to data structures used to package data for purposes of facilitating transmission (i.e., transport) of the data from one device or system to another, rendering or otherwise processing or analyzing the data, and/or for other purposes as may serve a particular implementation. In some examples, a transport stream may incorporate one or more data streams (e.g., one or more video data streams) and/or other data such as metadata or the like. Transport streams may be implemented as any type of transport stream that may serve a particular implementation. For example, certain transport streams described herein (e.g., transport stream 700) may be implemented as an MPEG transport stream, an MPEG-2 transport stream, or another suitable data structure that facilitates the transport of data such as surface data frame sequences, video data streams, and the like. A transport stream may be configured in accordance with any suitable data format, container format, and/or transport protocol as may serve a particular implementation.

While transport stream 700 is shown to include both captured and virtualized surface data frame sequences, it will be understood that, in certain implementations, transport stream 700 may include only captured surface data frame sequences or only virtualized surface data frame sequences. Additionally, transport stream 700 may include any suitable number of surface data frame sequences and any combination of surface data frame sequences as may serve a particular implementation. For example, as described above, in certain examples, transport stream 700 may include a single surface data frame sequence (e.g., virtualized surface data frame sequence 600) and the other surface data frame sequences, if transported at all, may be transported by way of other transport streams. It will also be understood that, while FIG. 7 illustrates a transport stream 700 that includes surface data frame sequences described and illustrated above (e.g., surface data frame sequences 400 and 600), these surface data frame sequences may be included within data structures such as encoded video data streams (not explicitly shown) and, as such, may refer to different versions of the data than was described above as being received and/or generated by system 100 (e.g., versions of the data that are encoded and/or compressed into video data streams or the like).

Figure 8:
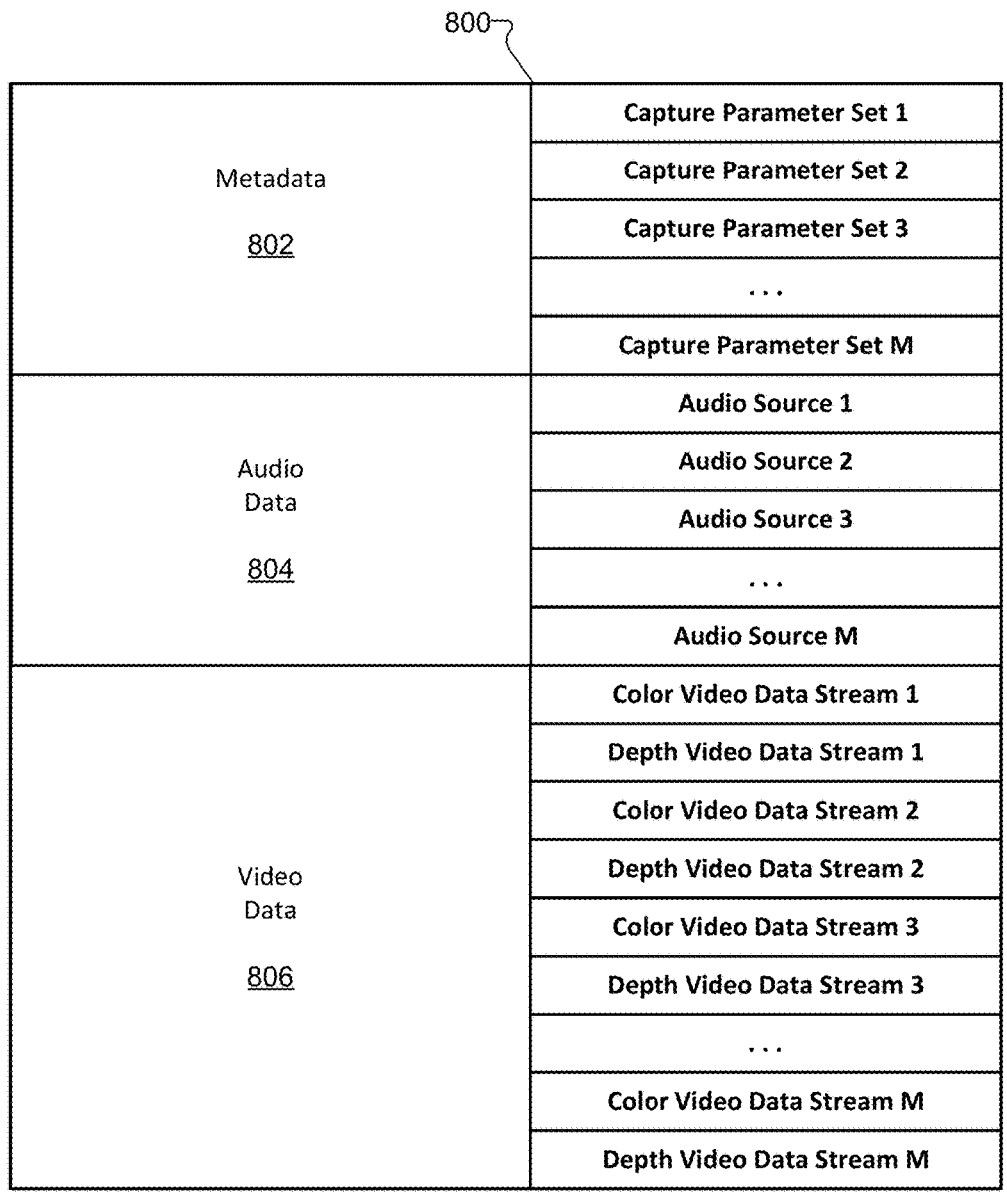
FIG. 8 illustrates a data structure representation of the exemplary transport stream of FIG. 7 according to principles described herein.

FIG. 8 illustrates a data structure representation 800 of transport stream 700. As shown, representation 800 includes sections for different types of data such as a section of metadata 802, a section of audio data 804, and a section of video data 806. It will be understood that the sections illustrated in representation 800 may be conceptual only and that the data shown in representation 800 may be multiplexed, organized, arranged, transmitted, etc. within transport stream 700 in any way as may serve a particular implementation.

As shown, metadata 802 includes various sets of capture parameters (i.e., "Capture Parameter Set 1" through "Capture Parameter Set M") correlating with each surface data frame sequence included within transport stream 700. For example, the set of capture parameters included within metadata 802 may include respective sets of capture parameters for each of the captured and virtualized surface data frame sequences shown in FIG. 7 (i.e., surface data frame sequences 400-1 through 400-8, 600, and 702-1 through 702-N). Metadata 802 may further include any other metadata describing the surface data frame sequences (e.g., or the video data streams in which the surface data frame sequences are encoded) as may serve a particular implementation.

Similarly, audio data 804 may include audio source data associated with each surface data frame sequence included within transport stream 700. For example, "Audio Source 1" through "Audio Source M" may be associated, respectively, with surface data frame sequences 400-1 through 400-8, 600, and 702-1 through 702-N. In other examples, there may be more or fewer audio sources than there are surface data frame sequences (e.g., a number of audio sources that is unrelated to the number of surface data frame sequences) if the audio sources are not associated with the surface data frame sequences.

As further shown in FIG. 8, video data 806 may include a color video data stream and a depth video data stream associated with each of the surface data frame sequences shown to be included within transport stream 700 in FIG. 7. For example, "Color Video Data Stream 1" and "Depth Video Data Stream 1" may be representative of color and depth frames included within surface data frame sequence 400-1, "Color Video Data Stream 2" and "Depth Video Data Stream 2" may be representative of color and depth frames included within surface data frame sequence 400-2, and so forth, such that each of surface data frame sequences 400-1 through 400-8, 600, and 702-1 through 702-N corresponds to both a color and a depth video data stream within video data 806.

As mentioned above, it may be useful in certain implementations to provide a relatively large number of virtualized surface data frame sequences to allow flexibility in generating different versions of virtual reality media content that may be customized with different details relevant for different media player devices (i.e., associated with different users having different virtual reality experiences) at different times. For example, in one implementation, eight physical capture devices may generate eight high resolution captured surface data frame sequences, and system 100 may generate, based on the eight captured surface data frame sequences, hundreds of virtualized surface data frame sequences for hundreds of virtualized projections of hundreds of customized views.

Providing such a large number of virtualized surface data frame sequences may allow for significant flexibility in efficiently generating and distributing virtual reality media content, but may be difficult to handle with available hardware and software resources that may not be equipped to handle so many individual streams of data (e.g., video data streams, etc.). As a result, it may be desirable to package a plurality of color and/or depth frames sequences into a single surface data frame sequence. For example, virtualized surface data frame sequence 600 may be packaged such that each of the rendered color and depth frames for virtualized projection 602 of customized view 502 of real-world scene 202 are represented as tiles in a video data stream implementing a tile map that represents a plurality of tiles in each frame of the video data stream. For instance, a tile mapping technique (e.g., a texture atlas technique, a sprite sheet technique, etc.) may be used to pack multiple color and/or depth frames together onto a single frame such that a sequence of such frames (e.g., or a video data stream representative of the sequence of these frames) may be treated essentially as a single frame sequence but may include data associated with multiple frame sequences (e.g., representative of multiple views including virtualized projections of customized views).

Figure 9:
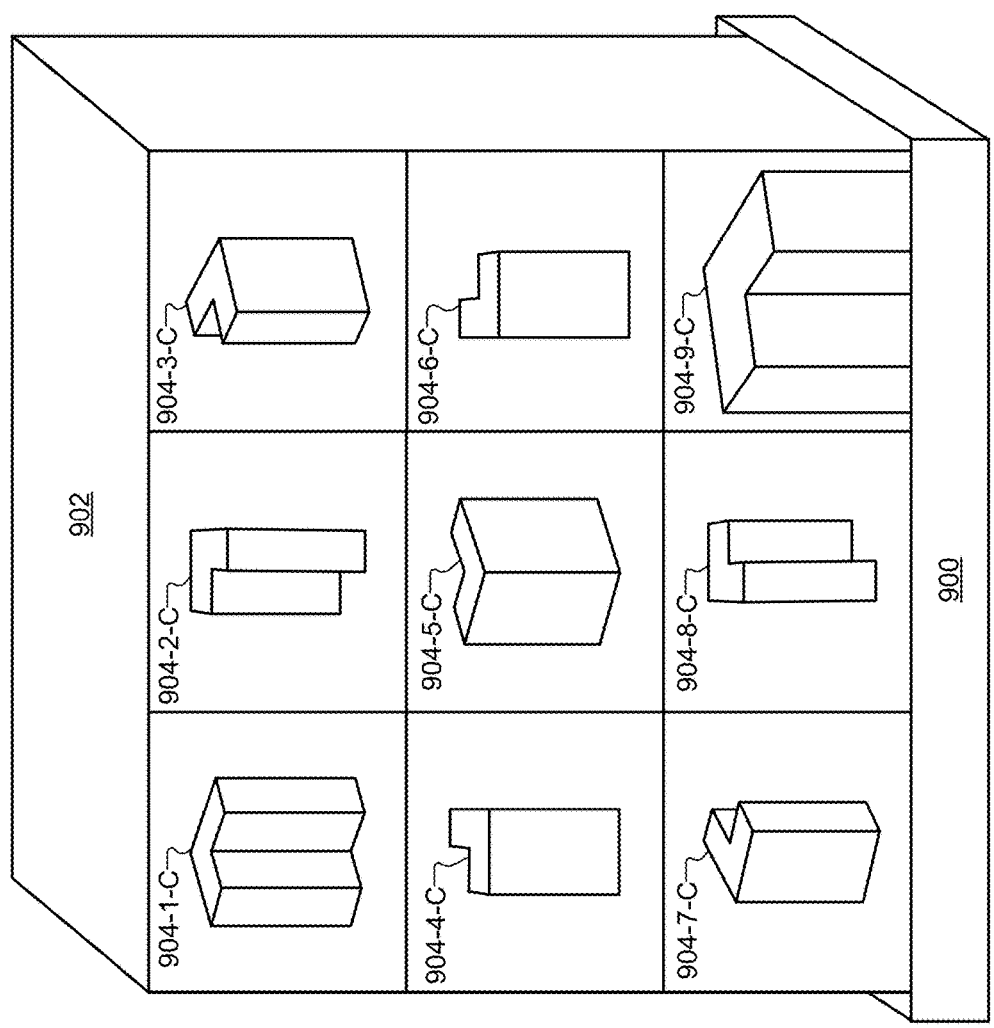
FIG. 9 illustrates a graphical representation of an exemplary transport stream that includes an exemplary frame sequence implementing a tile map according to principles described herein.

To illustrate, FIG. 9 shows a graphical representation of an exemplary transport stream 900 that includes an exemplary tiled frame sequence 902 that implements a tile map. While tiled frame sequence 902 is drawn as a block similar to surface data frame sequences illustrated herein (e.g., surface data frame sequences 400-1 in FIG. 4B, virtualized surface data frame sequence 600 in FIG. 6, etc.) it will be understood that tiled frame sequence 902 may represent different data than some of the other surface data frame sequences herein. Specifically, for example, tiled frame sequence 902 may not represent multiple frame sequences such as color frame sequence 402 and depth frame sequence 404 (shown in FIG. 4A) but rather may include a single sequence of frames each including a plurality of tiles 904 (i.e., tiles 904-1-C through 904-9-C) such as shown on the front of tiled frame sequence 902.

The tiles included on each frame of tiled frame sequence 902 may include any color or depth frames associated with any captured or virtualized surface data frame sequence as may serve a particular implementation. For example, as shown in FIG. 9, each frame of tiled frame sequence 902 may include a tile 904-1-C corresponding to a color ('C') frame captured from view 206-1, a tile 904-2-C corresponding to a color frame captured from view 206-2, and so forth up to a tile 904-8-C corresponding to a color frame captured from view 208-8. As further shown, each frame of tiled frame sequence 902 may include a tile 904-9-C associated with a color frame generated for virtualized projection 602 of customized view 502. While FIG. 9 explicitly illustrates only nine tiles, it will be understood that additional tiles may also be packed onto each frame of tiled frame sequence 902. For example, tiles corresponding to other virtualized projections, to depth frames (e.g., depth frames captured from views 206 and/or generated for virtualized projections), or the like may further be included within the tile map as may serve a particular implementation. Additionally, while transport stream 900 in FIG. 9 only illustrates one tiled frame sequence employing a tile map, it will be understood that transport stream 900 may be used to package multiple frame sequences including tiled frame sequences (e.g., such as tiled frame sequence 902), surface data frame sequences (e.g., such as frame sequences 400, 600, or 702), or other data as may serve a particular implementation. In some examples, tiled frame sequence 902 may be transmitted without being included in a transport stream such as transport stream 900.

FIG. 10 illustrates a data structure representation 1000 of transport stream 900. As shown, as with representation 800, representation 1000 includes sections for different types of data such as a section of metadata 1002, a section of audio data 1004, and a section of video data 1006. Also, as with representation 800, the sections illustrated in representation 1000 will be understood to be conceptual only, as the data shown in representation 1000 may be multiplexed, organized, arranged, transmitted, etc., within transport stream 900 in any way as may serve a particular implementation.

As shown, metadata 1002 includes two different types of metadata for each tile (e.g., tiles 904-1-C through 904-9-C and/or other tiles not explicitly shown in FIG. 9). Specifically, for each tile ("Tile 1," through "Tile M"), metadata 1002 includes tile coordinates (e.g., "Tile Coordinates 1" through "Tile Coordinates M") indicative of the section of each frame that is dedicated to data associated with that particular tile. For example, the tile coordinates for Tile 1 may include coordinates that indicate the top left corner of the frames where tile 904-1-C is shown in FIG. 9 and so forth. Metadata 1002 also includes, for each tile 1 through M, respective sets of capture parameters (i.e., "Capture Parameter Set 1" through "Capture Parameter Set M") correlating with the tile. For example, the set of capture parameters included within metadata 802 may include respective sets of capture parameters for each of the tiles shown in FIG. 9 (i.e., tiles 904-1-C through 904-9-C). Metadata 1002 may further include any other metadata describing the tiles of tiled frame sequence 902 (e.g., or the video data stream in which tiled frame sequence 902 is encoded) as may serve a particular implementation.

Similar to audio data 804 in representation 800, audio data 1004 may include audio source data associated with each tile included within tiled frame sequence 902 (i.e., within transport stream 900). For example, "Audio Source 1" through "Audio Source M" may be associated, respectively, with tiles 904-1-C through 904-9-C and/or other tiles not explicitly shown in FIG. 9. In other examples, there may be more or fewer audio sources if the tiles are not specifically associated with the audio sources.

In contrast with representation 800 in FIG. 8, where multiple color and depth video streams associated with each surface data frame sequence were included, representation 1000 shows that video data 1006 includes only one video data stream associated with tiled frame sequence 902. This is because, as illustrated by FIG. 9, all of the images associated with each color and/or depth frame represented by tiled frame sequence 902 are packed together onto each frame in tiled frame sequence 902. In certain examples, transport stream 900 may include one frame sequence (e.g., tiled frame sequence 902) dedicated to color data tiles and a second frame sequence (not explicitly shown in FIG. 9) dedicated to depth data tiles. As such, in these examples, video data 1006 may include both a color video data stream and a depth video data stream. In yet other examples, as mentioned above, transport stream 900 may include other frame sequences, video streams, etc. (e.g., whether tiled or untiled) along with tiled frame sequence 902. As such, in these examples, video data 1006 may include other video data streams not explicitly shown in FIG. 10.

As mentioned above, in some examples, system 100 and/or other systems (e.g., other server-side systems) and devices described herein may be used to generate virtual reality media content to be experienced by users. For example, in addition to the operations described above, a virtual reality media content provider system (e.g., within which system 100 and/or other devices and systems described herein may be included or with which these systems may otherwise be associated) may further generate and provide virtual reality media content based on data that system 100 provides. The virtual reality media content may be representative of a real-world scene (e.g., real-world scene 202) and may be presentable to the user so as to be experienced from a dynamically selectable virtual viewpoint corresponding to an arbitrary virtual location with respect to the real-world scene. For example, the dynamically selectable virtual viewpoint may be selected (e.g., determined, placed, etc.) by the user of the media player device while the user is virtually experiencing the real-world scene using the media player device. In some examples, the virtual viewpoint may be selected to be in any location along a two-dimensional or three-dimensional continuum, as opposed to only being selected from a discrete set of viewpoints. Moreover, the virtual reality media content may be provided (e.g., by the virtual reality media content provider system that includes or is otherwise associated with system 100) to the media player device to allow the user to virtually experience the real-world scene from the dynamically selectable virtual viewpoint corresponding to the arbitrary virtual location within the real-world scene.

Figure 11:
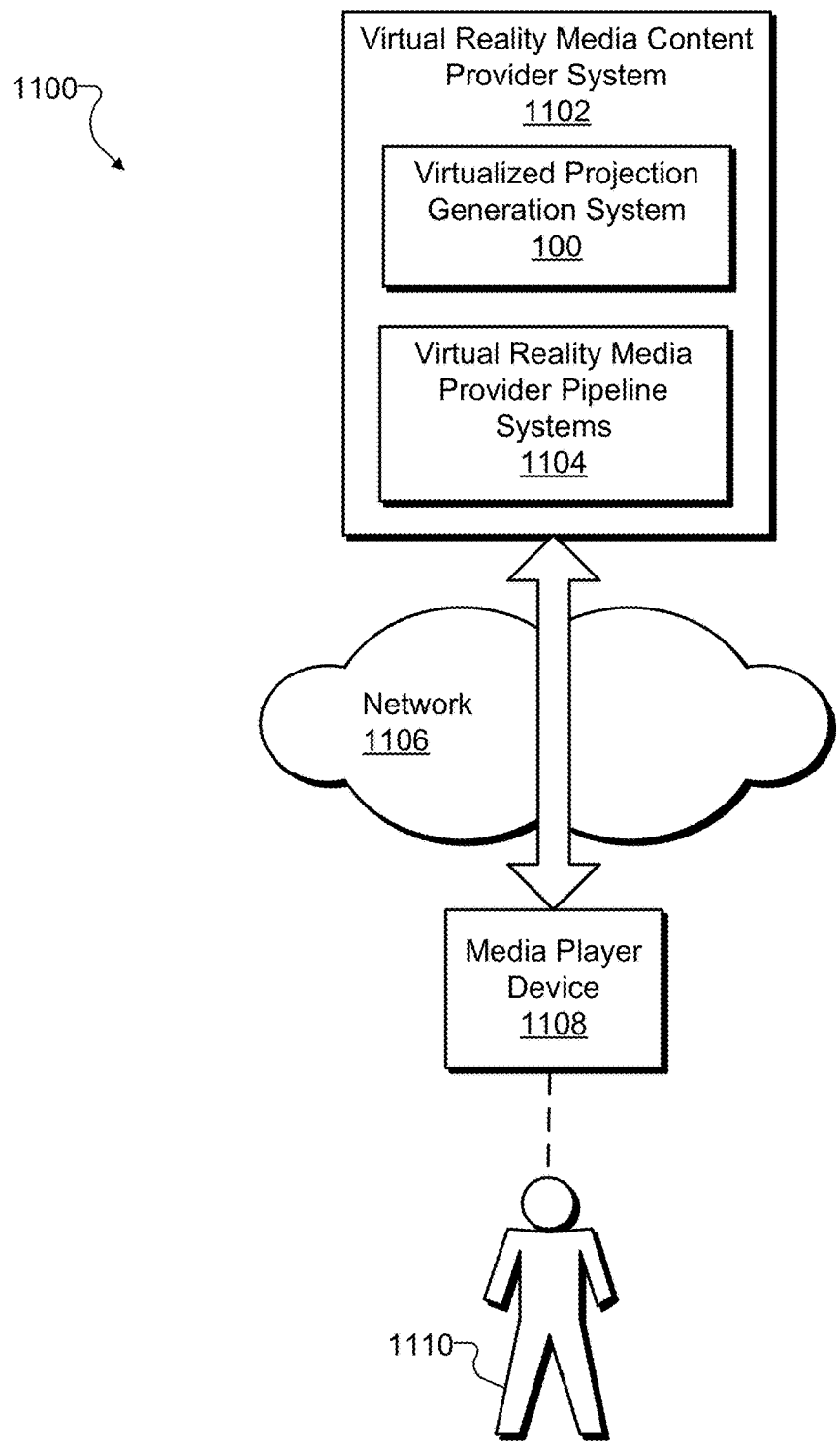
FIG. 11 illustrates an exemplary configuration in which an exemplary virtual reality media content provider system generates virtual reality media content based on a real-world scene and provides the virtual reality media content to an exemplary client-side media player device used by a user to experience a representation of the real-world scene according to principles described herein.

To illustrate, FIG. 11 shows an exemplary configuration 1100 in which an exemplary virtual reality media content provider system 1102 ("provider system 1102") that includes system 100 and one or more additional virtual reality media provider pipeline systems 1104 generates virtual reality media content that is provided by way of a network 1106 to an exemplary client-side media player device 1108 ("media player device 1108") used by a user 1110 to experience real-world scene 202.

After virtualized surface data frame sequence 600 has been generated and packaged into a transport stream (e.g., transport stream 700, transport stream 900, etc.) as described above, provider system 1102 may further encode, package, encrypt, or otherwise process the one or more transport streams to form virtual reality media content that media player device 1108 may be configured to render. For example, the virtual reality media content may include or be representative of a plurality of 2D video data streams (e.g., 2D video data streams associated with color data and depth data associated with each view and virtualized projection) that may be rendered by media player device 1108 so as to present a view of real-world scene 202 from any arbitrary virtual viewpoint within real-world scene 202 (e.g., including virtual viewpoints that do not align with any capture device view or customized view but that may be of interest to user 1110), as will be described below. The virtual reality media content may then be distributed by way of network 1106 to one or more media player devices such as media player device 1108 associated with user 1110. For example, provider system 1102 may provide the virtual reality media content to media player device 1108 so that user 1110 may experience real-world scene 202 virtually using media player device 1108.

In some examples, it may be undesirable for user 1110 to be limited to one or more discrete positions within an immersive virtual reality world represented by the virtual reality media content (e.g., representative of real-world scene 202). As such, provider system 1102 may provide sufficient data within the virtual reality media content representative of real-world scene 202 to allow real-world scene 202 to be represented not only from views 206 and/or 502, but from any dynamically selectable virtual viewpoint corresponding to an arbitrary virtual location within real-world scene 202. For example, the dynamically selectable virtual viewpoint may be selected by user 1110 while user 1110 is experiencing real-world scene 202 using media player device 1108.

As used herein, an "arbitrary virtual location" may refer to any virtual point in space associated with a representation of a real-world scene. For example, arbitrary virtual locations are not limited to fixed positions surrounding the real-world scene (e.g., fixed positions associated with views 206 and/or customized view 502), but also include all the positions between the positions associated with views 206 and customized view 502. In some examples, such arbitrary virtual locations may correspond to the most desirable virtual viewpoints within real-world scene 202. For instance, if real-world scene 202 includes a basketball game, user 1110 may dynamically select virtual viewpoints from which to experience the game that are in any arbitrary virtual location on the basketball court. For example, the user may dynamically select his or her virtual viewpoints to follow the basketball up and down the basketball court and experience the basketball game as if standing on the basketball court in the middle of the action of the game.

Network 1106 may include a provider-specific wired or wireless network (e.g., a cable or satellite carrier network or a mobile telephone network), the Internet, a wide area network, a content delivery network, or any other suitable network. Data may flow between provider system 1102 and media player device 1108 (as well as other media player devices not explicitly shown) using any communication technologies, devices, media, and protocols as may serve a particular implementation.

Media player device 1108 may be used by user 1110 to access and experience virtual reality media content received from provider system 1102. For example, media player device 1108 may be configured to generate a 3D virtual representation of real-world scene 202 to be experienced by user 1110 from an arbitrary virtual viewpoint (e.g., a dynamically selectable virtual viewpoint selected by the user and corresponding to an arbitrary virtual location within real-world scene 202). To this end, media player device 1108 may include or be implemented by any device capable of presenting a field of view of an immersive virtual reality world (e.g., an immersive virtual reality world representative of real-world scene 202) and detecting user input from user 1110 to dynamically update the immersive virtual reality world presented within the field of view as user 1110 experiences the immersive virtual reality world.

Figure 12:
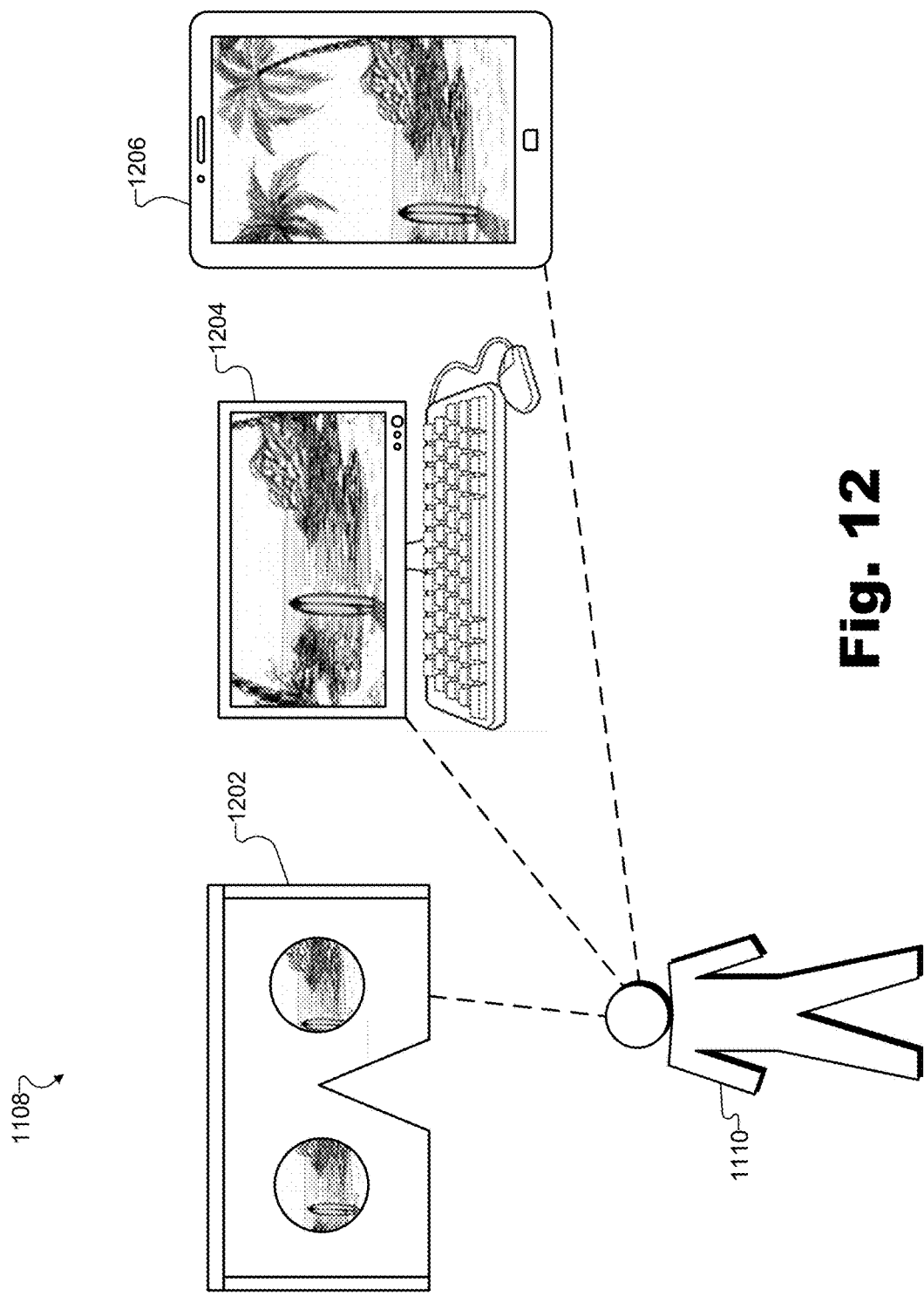
FIG. 12 illustrates various exemplary types of media player devices that may be used by a user to experience virtual reality media content according to principles described herein.

FIG. 12 shows various exemplary types of media player devices 1108 that may be used by user 1110 to experience virtual reality media content. Specifically, as shown, media player device 1108 may take one of several different form factors such as a head-mounted virtual reality device 1202 (e.g., a virtual reality gaming device) that includes a head-mounted display screen, a personal computer device 1204

(e.g., a desktop computer, laptop computer, etc.), a mobile or wireless device 1206 (e.g., a smartphone, a tablet device, etc., possibly mounted to the head of user 1110 by means of a head mount apparatus), or by any other device or configuration of devices that may serve a particular implementation to facilitate receiving and/or presenting virtual reality media content. Different types of media player devices (e.g., head-mounted virtual reality devices, personal computer devices, mobile devices, etc.) may provide different types of virtual reality experiences having different levels of immersiveness for user 1110.

Figure 13:
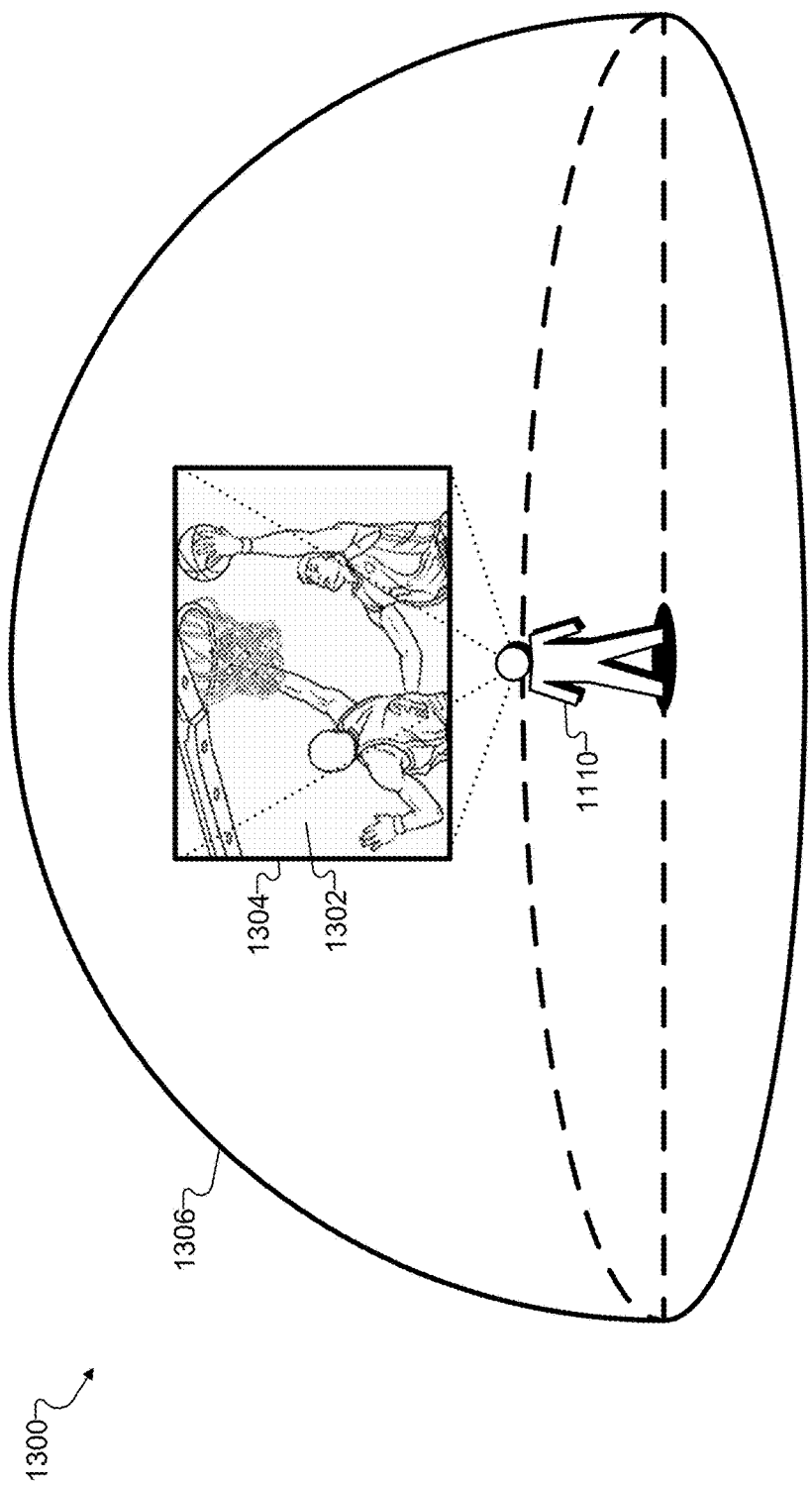
FIG. 13 illustrates an exemplary virtual reality experience in which a user is presented with exemplary virtual reality media content based on a real-world scene as experienced from a dynamically selectable virtual viewpoint corresponding to an exemplary arbitrary virtual location with respect to the real-world scene according to principles described herein.

FIG. 13 illustrates an exemplary virtual reality experience 1300 in which user 1110 is presented with exemplary virtual reality media content representative of a real-world scene as experienced from a dynamically selectable virtual viewpoint corresponding to an exemplary arbitrary virtual location with respect to the real-world scene. Specifically, virtual reality media content 1302 is presented within a field of view 1304 that shows a real-world scene from a virtual viewpoint corresponding to an arbitrary virtual location right underneath a basketball standard within the representation of the real-world scene where a shot is being made. An immersive virtual reality world 1306 based on the real-world scene may be available for the viewer to experience by providing user input (e.g., head movements, keyboard input, etc.) to look around and/or to move around (i.e., dynamically select a virtual viewpoint from which to experience) immersive virtual reality world 1306.

For example, field of view 1304 may provide a window through which user 1110 may easily and naturally look around immersive virtual reality world 1306. Field of view 1304 may be presented by media player device 1108 (e.g., on a display screen of media player device 1108) and may include video depicting objects surrounding the user within immersive virtual reality world 1306. Additionally, field of view 1304 may dynamically change in response to user input provided by user 1110 as user 1110 experiences immersive virtual reality world 1306. For example, media player device 1108 may detect user input (e.g., moving or turning the display screen upon which field of view 1304 is presented). In response, field of view 1304 may display different objects and/or objects seen from a different virtual viewpoint or virtual location in place of the objects seen from the previous virtual viewpoint or virtual location.

In FIG. 13, immersive virtual reality world 1306 is illustrated as a semi-sphere, indicating that user 1110 may look in any direction within immersive virtual reality world 1306 that is substantially forward, backward, left, right, and/or up from the virtual viewpoint of the location under the basketball standard that user 1110 has currently selected. In other examples, immersive virtual reality world 1306 may include an entire 360° by 180° sphere such that user 1110 may also look down. Additionally, user 1110 may move around to other locations within immersive virtual reality world 1306 (i.e., dynamically selecting different dynamically selectable virtual viewpoints within the representation of the real-world scene). For example, user 1110 may select a virtual viewpoint at half court, a virtual viewpoint from the free-throw line facing the basketball standard, a virtual viewpoint suspended above the basketball standard, or the like.

Figure 14:
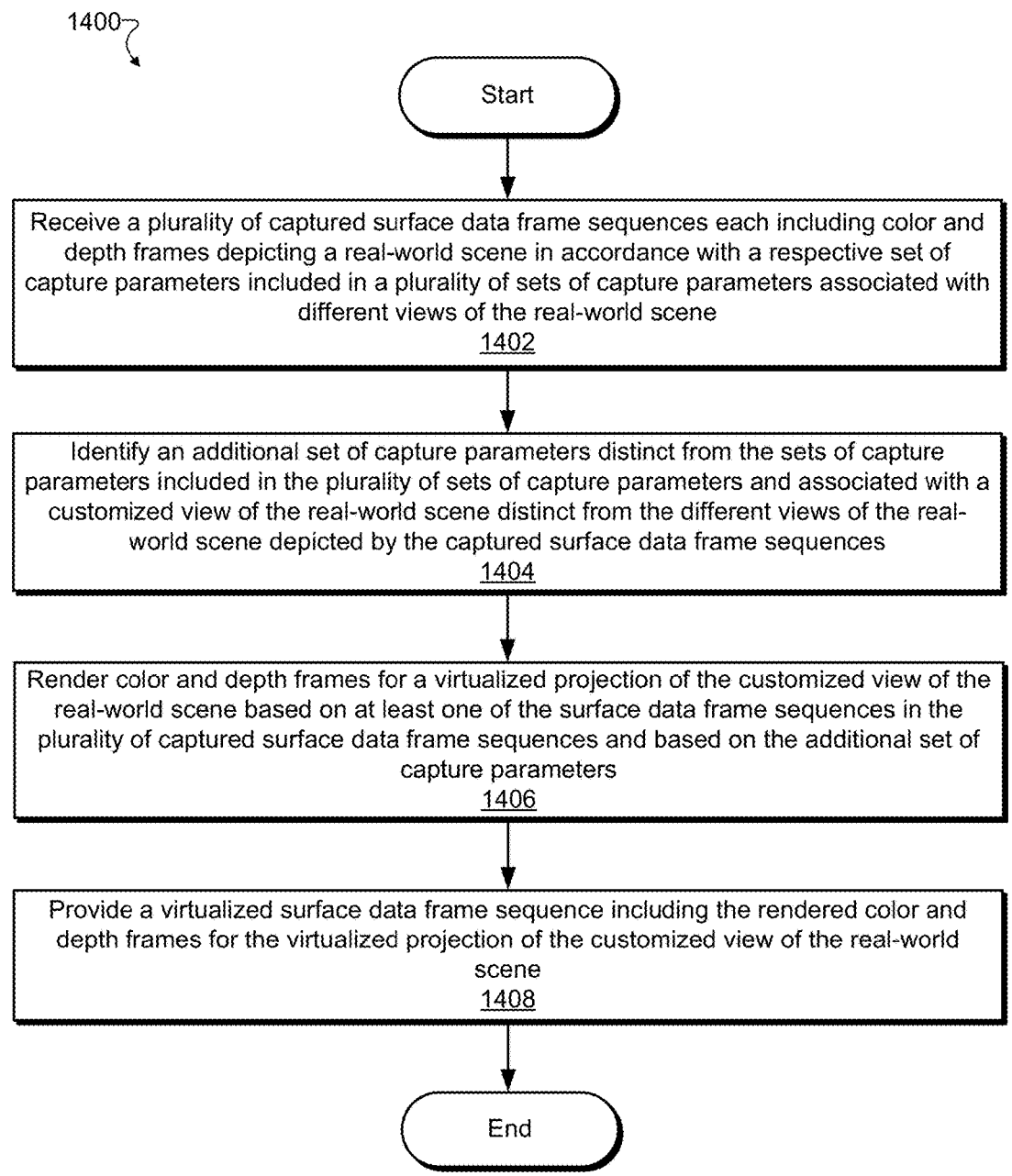
FIGS. 14 and 15 illustrate exemplary methods for generating a virtualized projection of a customized view of a real-world scene for inclusion within virtual reality media content according to principles described herein.

FIG. 14 illustrates an exemplary method 1400 for generating a virtualized projection of a customized view of a real-world scene for inclusion within virtual reality media content. While FIG. 14 illustrates exemplary operations according to one embodiment, other embodiments may omit, add to, reorder, and/or modify any of the operations shown in FIG. 14. One or more of the operations shown in FIG. 14 may be performed by system 100, an implementation thereof, and/or another system described above as being associated with (e.g., communicatively coupled to, configured to interoperate with, etc.) system 100.

In operation 1402, a virtualized projection generation system may receive a plurality of captured surface data frame sequences each including color and depth frames depicting a real-world scene in accordance with a respective set of capture parameters included in a plurality of sets of capture parameters associated with different views of the real-world scene. In some examples, each surface data frame sequence in the plurality of captured surface data frame sequences may be captured by a different capture device in a plurality of capture devices disposed at different locations with respect to the real-world scene so as to capture the different views of the real-world scene. Operation 1402 may be performed in any of the ways described herein.

In operation 1404, the virtualized projection generation system may identify an additional set of capture parameters distinct from the sets of capture parameters included in the plurality of sets of capture parameters associated with the captured surface data frame sequences received in operation 1402. In some examples, the additional set of capture parameters may be associated with a customized view of the real-world scene distinct from the different views of the real-world scene captured by the plurality of capture devices. Operation 1404 may be performed in any of the ways described herein.

In operation 1406, the virtualized projection generation system may render color and depth frames for a virtualized projection of the customized view of the real-world scene. For example, the virtualized projection generation system may render the color and depth frames for the virtualized projection based on the captured surface data frame sequences received in operation 1402 and based on the additional set of capture parameters identified in operation 1404. Operation 1406 may be performed in any of the ways described herein.

In operation 1408, the virtualized projection generation system may provide a virtualized surface data frame sequence including the rendered color and depth frames for the virtualized projection of the customized view of the real-world scene rendered in operation 1406. In some examples, the virtualized projection generation system may provide the virtualized surface data frame sequence for inclusion within virtual reality media content for a media player device. Operation 1408 may be performed in any of the ways described herein.

Figure 15:
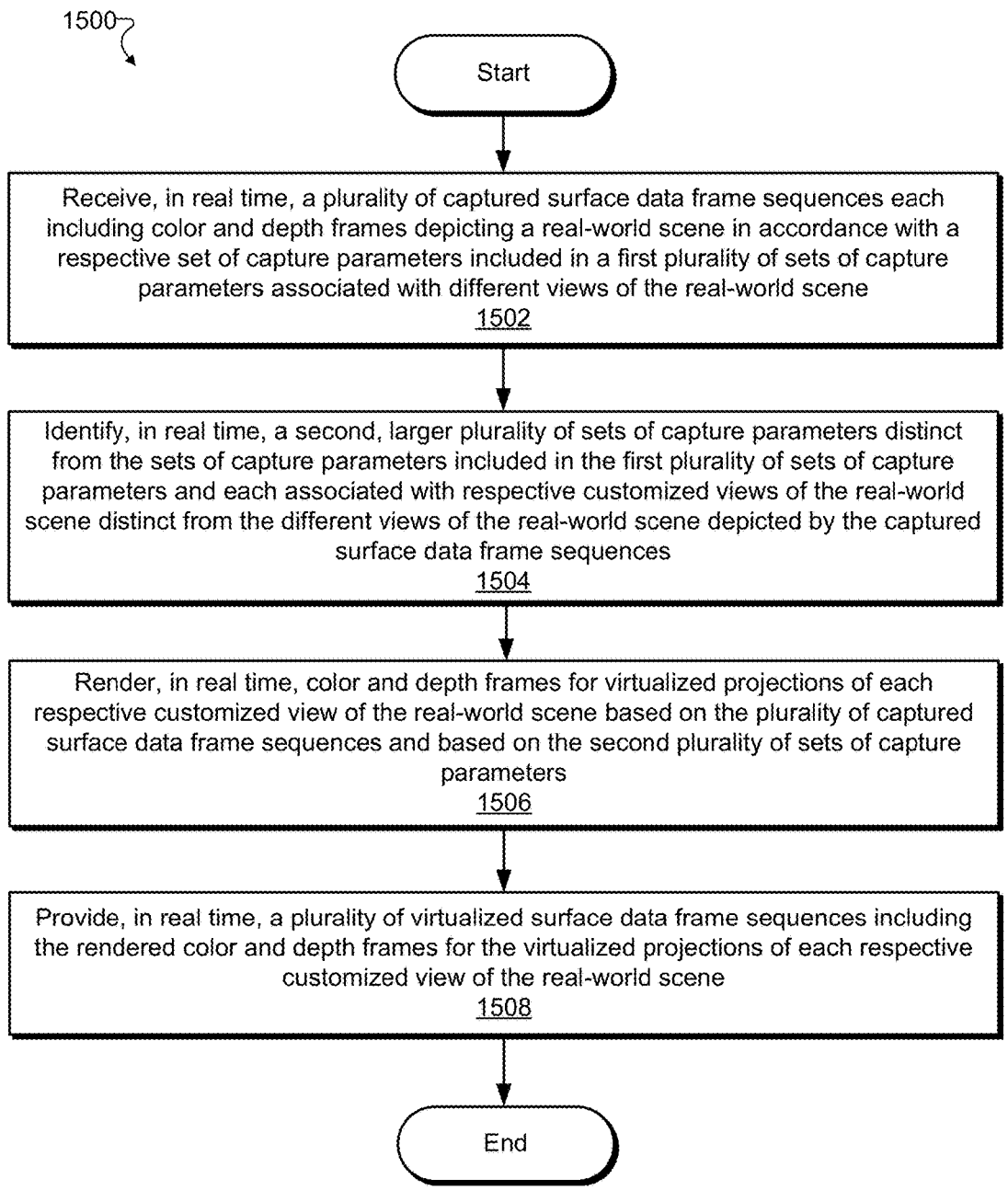

FIG. 15 illustrates an exemplary method 1500 for generating a virtualized projection of a customized view of a real-world scene for inclusion within virtual reality media content. While FIG. 15 illustrates exemplary operations according to one embodiment, other embodiments may omit, add to, reorder, and/or modify any of the operations shown in FIG. 15. One or more of the operations shown in FIG. 15 may be performed by system 100, an implementation thereof, and/or another system described above as being associated with (e.g., communicatively coupled to, configured to interoperate with, etc.) system 100.

In operation 1502, a virtualized projection generation system may receive a plurality of captured surface data frame sequences each including color and depth frames depicting a real-world scene in accordance with a respective set of capture parameters included in a first plurality of sets of capture parameters associated with different views of the real-world scene. For example, each surface data frame sequence in the plurality of captured surface data frame sequences may be captured by a different capture device in a plurality of capture devices disposed at different locations with respect to the real-world scene so as to capture the different views of the real-world scene. In certain examples, operation 1502 may be performed in real time as events occur within the real-world scene. Operation 1502 may be performed in any of the ways described herein.

In operation 1504, the virtualized projection generation system may identify a second plurality of sets of capture parameters distinct from the sets of capture parameters included in the first plurality of sets of capture parameters. For example, each set of capture parameters in the second plurality of sets of capture parameters may be associated with a respective customized view of the real-world scene distinct from the different views of the real-world scene captured by the plurality of capture devices discussed above in relation to operation 1502. In some examples, the second plurality of sets of capture parameters may include a greater number of sets than is included in the first plurality of sets of capture parameters associated with the captured surface data frame sequences received in operation 1502. As with operation 1502, in certain implementations, operation 1504 may be performed in real time as the events occur within the real-world scene, Operation 1504 may be performed in any of the ways described herein.

In operation 1506, the virtualized projection generation system may render color and depth frames for virtualized projections of each respective customized view of the real-world scene for which a set of capture parameters in the second plurality of sets of capture parameters is identified in operation 1504. In some examples, the virtualized projection generation system may render the color and depth frames based on the plurality of captured surface data frame sequences received in operation 1502 and based on the second plurality of sets of capture parameters identified in operation 1504. As with operations 1502 and 1504, in certain implementations, operation 1506 may be performed in real time as the events occur within the real-world scene. Operation 1506 may be performed in any of the ways described herein.

In operation 1508, the virtualized projection generation system may provide a plurality of virtualized surface data frame sequences including the color and depth frames for the virtualized projections of each respective customized view of the real-world scene rendered in operation 1506. For example, the virtualized projection generation system may provide the plurality of virtualized surface data frame sequences for inclusion within virtual reality media content for a media player device. As with operations 1502 through 1506, operation 1508 may be performed in real time as the events occur within the real-world scene. Operation 1508 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 16:
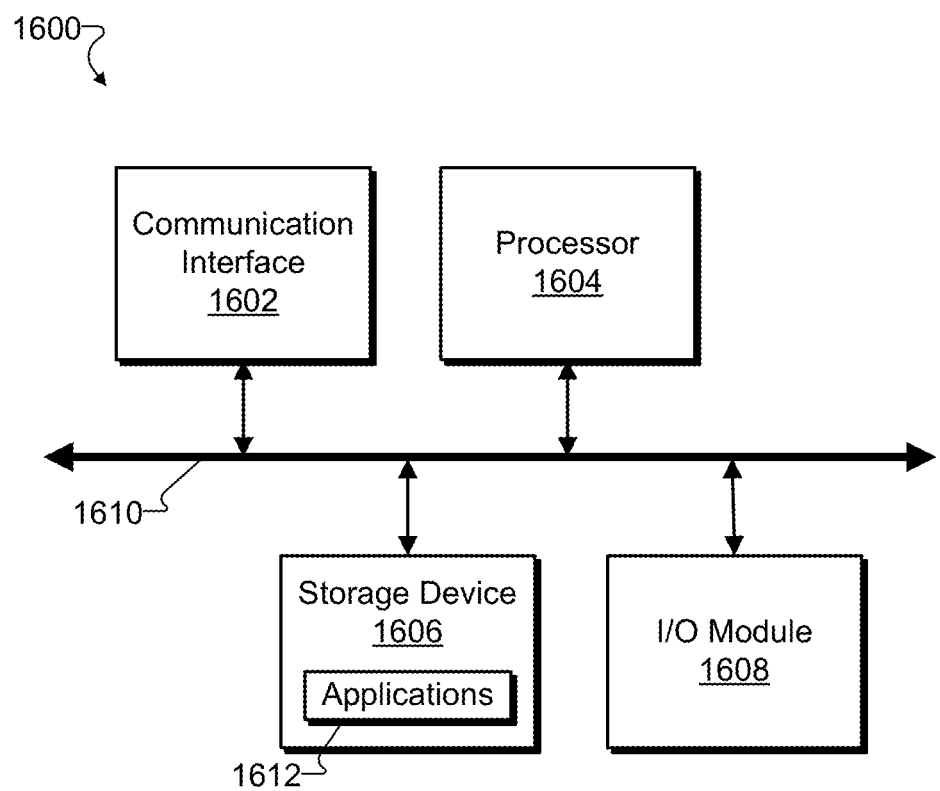
FIG. 16 illustrates an exemplary computing device according to principles described herein.

FIG. 16 illustrates an exemplary computing device 1600 that may be specifically configured to perform one or more of the processes described herein. As shown in FIG. 16, computing device 1600 may include a communication interface 1602, a processor 1604, a storage device 1606, and an input/output ("I/O") module 1608 communicatively connected via a communication infrastructure 1610. While an exemplary computing device 1600 is shown in FIG. 16, the components illustrated in FIG. 16 are not intended to be limiting. Additional or alternative components may be used in other embodiments. Components of computing device 1600 shown in FIG. 16 will now be described in additional detail.

Communication interface 1602 may be configured to communicate with one or more computing devices. Examples of communication interface 1602 include, without limitation, a wired network interface (such as a network interface card), a wireless network interface (such as a wireless network interface card), a modem, an audio/video connection, and any other suitable interface.

Processor 1604 generally represents any type or form of processing unit (e.g., a central processing unit and/or a graphics processing unit) capable of processing data or interpreting, executing, and/or directing execution of one or more of the instructions, processes, and/or operations described herein. Processor 1604 may direct execution of operations in accordance with one or more applications 1612 or other computer-executable instructions such as may be stored in storage device 1606 or another computer-readable medium.

Storage device 1606 may include one or more data storage media, devices, or configurations and may employ any type, form, and combination of data storage media and/or device. For example, storage device 1606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1606. For example, data representative of one or more executable applications 1612 configured to direct processor 1604 to perform any of the operations described herein may be stored within storage device 1606. In some examples, data may be arranged in one or more databases residing within storage device 1606.

I/O module 1608 may include one or more I/O modules configured to receive user input and provide user output. One or more I/O modules may be used to receive input for a single virtual reality experience. I/O module 1608 may include any hardware, firmware, software, or combination thereof supportive of input and output capabilities. For example, I/O module 1608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1600. For example, one or more applications 1612 residing within storage device 1606 may be configured to direct processor 1604 to perform one or more operations or functions associated with communication facility 102, surface data frame sequence management facility 104, or virtualized projection generation facility 106 of system 100 (see FIG. 1). Likewise, storage facility 108 of system 100 may be implemented by or within storage device 1606.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
receiving, by a virtualized projection generation system, a plurality of captured surface data frame sequences each including color and depth frames depicting a real-world scene in accordance with a respective set of capture parameters included in a plurality of sets of capture parameters associated with different views of the real-world scene, each surface data frame sequence in the plurality of captured surface data frame sequences captured by a different capture device in a plurality of capture devices disposed at different locations with respect to the real-world scene so as to capture the different views of the real-world scene;
identifying, by the virtualized projection generation system, an additional set of capture parameters distinct from the sets of capture parameters included in the plurality of sets of capture parameters and associated with a customized view of the real-world scene distinct from the different views of the real-world scene captured by the plurality of capture devices;
rendering, by the virtualized projection generation system based on at least one of the surface data frame sequences in the plurality of captured surface data frame sequences and based on the additional set of capture parameters, color and depth frames for a virtualized projection of the customized view of the real-world scene; and
providing, by the virtualized projection generation system for inclusion within virtual reality media content for a media player device, a virtualized surface data frame sequence including the rendered color and depth frames for the virtualized projection of the customized view of the real-world scene.

2. The method of claim 1, wherein:
the customized view of the real-world scene is unaligned with the different views of the real-world scene captured by the plurality of capture devices disposed at the different locations with respect to the real-world scene; and
the rendering of the color and depth frames for the virtualized projection of the customized view of the real-world scene includes rendering color and depth frames based on at least two of the surface data frame sequences in the plurality of captured surface data frame sequences.

3. The method of claim 1, wherein each set of capture parameters included in the plurality of sets of capture parameters associated with the different views of the real-world scene includes at least one of:
a capture parameter representative of a location with respect to the real-world scene from which color and depth frames corresponding to a particular view of the real-world scene are captured;
a capture parameter representative of an orientation from which the color and depth frames corresponding to the particular view of the real-world scene are captured;
a capture parameter representative of a field of view with which the color and depth frames corresponding to the particular view of the real-world scene are captured; and
a capture parameter representative of an image quality with which the color and depth frames corresponding to the particular view of the real-world scene are captured.

4. The method of claim 1, wherein the additional set of capture parameters associated with the customized view of the real-world scene includes at least one of:
- a capture parameter representative of a customized field of view associated with the customized view of the real-world scene, the customized field of view narrower than a captured field of view associated with the at least one of the surface data frame sequences upon which the rendering of the color and depth frames for the virtualized projection is based; and
- a capture parameter representative of a customized image quality associated with the customized view of the real-world scene, the customized image quality lower than a captured image quality associated with the at least one of the surface data frame sequences upon which the rendering of the color and depth frames for the virtualized projection is based.

5. The method of claim 1, wherein the identifying of the additional set of capture parameters includes:
- analyzing the real-world scene with respect to one or more geometric properties of the real-world scene;
- generating, based on the analyzing of the real-world scene, a plurality of additional sets of capture parameters distinct from the sets of capture parameters included in the plurality of sets of capture parameters and that includes the additional set of capture parameters; and
- identifying the additional set of capture parameters from the plurality of additional sets of capture parameters.

6. The method of claim 1, wherein the virtualized surface data frame sequence provided for inclusion within the virtual reality media content is packaged such that the rendered color and depth frames for the virtualized projection of the customized view of the real-world scene are included within a transport stream that does not include color and depth frames representative of additional surface data frame sequences other than the virtualized surface data frame sequence.

7. The method of claim 1, wherein the virtualized surface data frame sequence provided for inclusion within the virtual reality media content is packaged such that the rendered color and depth frames for the virtualized projection of the customized view of the real-world scene are included within a transport stream that further includes color and depth frames representative of at least one additional surface data frame sequence other than the virtualized surface data frame sequence.

8. The method of claim 1, wherein the virtualized surface data frame sequence provided for inclusion within the virtual reality media content is packaged such that each of the rendered color and depth frames for the virtualized projection of the customized view of the real-world scene are represented as tiles in a tiled video data stream implementing a tile map that represents a plurality of tiles in each frame of the tiled video data stream.

9. The method of claim 1, embodied as computer-executable instructions on at least one non-transitory computer-readable medium.

10. A method comprising:
- receiving, by a virtualized projection generation system in real time as events occur within a real-world scene, a plurality of captured surface data frame sequences each including color and depth frames depicting the real-world scene in accordance with a respective set of capture parameters included in a first plurality of sets of capture parameters associated with different views of the real-world scene, each surface data frame sequence in the plurality of captured surface data frame sequences captured by a different capture device in a plurality of capture devices disposed at different locations with respect to the real-world scene so as to capture the different views of the real-world scene;
- identifying, by the virtualized projection generation system in real time as the events occur within the real-world scene, a second plurality of sets of capture parameters distinct from the sets of capture parameters included in the first plurality of sets of capture parameters and each associated with respective customized views of the real-world scene distinct from the different views of the real-world scene captured by the plurality of capture devices, the second plurality of sets of capture parameters including a greater number of sets than is included in the first plurality of sets of capture parameters;
- rendering, by the virtualized projection generation system in real time as the events occur within the real-world scene, color and depth frames for virtualized projections of each respective customized view of the real-world scene based on the plurality of captured surface data frame sequences and based on the second plurality of sets of capture parameters; and
- providing, by the virtualized projection generation system in real time as the events occur within the real-world scene and for inclusion within virtual reality media content for a media player device, a plurality of virtualized surface data frame sequences including the rendered color and depth frames for the virtualized projections of each respective customized view of the real-world scene.

11. The method of claim 10, wherein:
- a particular customized view of the real-world scene associated with a particular set of capture parameters in the second plurality of sets of capture parameters is unaligned with the different views of the real-world scene captured by the plurality of capture devices disposed at the different locations with respect to the real-world scene; and
- the rendering of the color and depth frames for the virtualized projection of the particular customized view of the real-world scene includes rendering color and depth frames based on at least two of the surface data frame sequences in the plurality of captured surface data frame sequences.

12. The method of claim 10, embodied as computer-executable instructions on at least one non-transitory computer-readable medium.

13. A system comprising:
at least one physical computing device that
- receives a plurality of captured surface data frame sequences each including color and depth frames depicting a real-world scene in accordance with a respective set of capture parameters included in a plurality of sets of capture parameters associated with different views of the real-world scene, each surface data frame sequence in the plurality of captured surface data frame sequences captured by a different capture device in a plurality of capture devices disposed at different locations with respect to the real-world scene so as to capture the different views of the real-world scene;
- identifies an additional set of capture parameters distinct from the sets of capture parameters included in the plurality of sets of capture parameters and associated with a customized view of the real-world scene distinct from the different views of the real-world scene captured by the plurality of capture devices;

renders, based on at least one of the surface data frame sequences in the plurality of captured surface data frame sequences and based on the additional set of capture parameters, color and depth frames for a virtualized projection of the customized view of the real-world scene; and provides, for inclusion within virtual reality media content for a media player device, a virtualized surface data frame sequence including the rendered color and depth frames for the virtualized projection of the customized view of the real-world scene.

14. The system of claim 13, wherein:
the customized view of the real-world scene is unaligned with the different views of the real-world scene captured by the plurality of capture devices disposed at the different locations with respect to the real-world scene; and the rendering of the color and depth frames for the virtualized projection of the customized view of the real-world scene includes rendering color and depth frames based on at least two of the surface data frame sequences in the plurality of captured surface data frame sequences.

15. The system of claim 13, wherein each set of capture parameters included in the plurality of sets of capture parameters associated with the different views of the real-world scene includes at least one of:

a capture parameter representative of a location with respect to the real-world scene from which color and depth frames corresponding to a particular view of the real-world scene are captured;

a capture parameter representative of an orientation from which the color and depth frames corresponding to the particular view of the real-world scene are captured;

a capture parameter representative of a field of view with which the color and depth frames corresponding to the particular view of the real-world scene are captured; and a capture parameter representative of an image quality with which the color and depth frames corresponding to the particular view of the real-world scene are captured.

16. The system of claim 13, wherein the additional set of capture parameters associated with the customized view of the real-world scene includes at least one of:

a capture parameter representative of a customized field of view associated with the customized view of the real-world scene, the customized field of view narrower than a captured field of view associated with the at least one of the surface data frame sequences upon which the rendering of the color and depth frames for the virtualized projection is based; and a capture parameter representative of a customized image quality associated with the customized view of the real-world scene, the customized image quality lower than a captured image quality associated with the at least one of the surface data frame sequences upon which the rendering of the color and depth frames for the virtualized projection is based.

17. The system of claim 13, wherein the at least one physical computing device identifies the additional set of capture parameters by:

analyzing the real-world scene with respect to one or more geometric properties of the real-world scene;

generating, based on the analyzing of the real-world scene, a plurality of additional sets of capture parameters distinct from the sets of capture parameters included in the plurality of sets of capture parameters and that includes the additional set of capture parameters; and identifying the additional set of capture parameters from the plurality of additional sets of capture parameters.

18. The system of claim 13, wherein the virtualized surface data frame sequence provided for inclusion within the virtual reality media content is packaged such that the rendered color and depth frames for the virtualized projection of the customized view of the real-world scene are included within a transport stream that does not include color and depth frames representative of additional surface data frame sequences other than the virtualized surface data frame sequence.

19. The system of claim 13, wherein the virtualized surface data frame sequence provided for inclusion within the virtual reality media content is packaged such that the rendered color and depth frames for the virtualized projection of the customized view of the real-world scene are included within a transport stream that further includes color and depth frames representative of at least one additional surface data frame sequence other than the virtualized surface data frame sequence.

20. The system of claim 13, wherein the virtualized surface data frame sequence provided for inclusion within the virtual reality media content is packaged such that each of the rendered color and depth frames for the virtualized projection of the customized view of the real-world scene are represented as tiles in a tiled video data stream implementing a tile map that represents a plurality of tiles in each frame of the tiled video data stream.

* * * * *